US011510166B1

(12) United States Patent
Abedini et al.

(10) Patent No.: US 11,510,166 B1
(45) Date of Patent: Nov. 22, 2022

(54) PHASE CONTINUITY INDICATION

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/342,911

(22) Filed: Jun. 9, 2021

(51) Int. Cl.
*H04W 56/00* (2009.01)
*H04W 72/14* (2009.01)
*H04L 5/14* (2006.01)
*H04L 5/00* (2006.01)

(52) U.S. Cl.
CPC ....... *H04W 56/0035* (2013.01); *H04L 5/0048* (2013.01); *H04L 5/14* (2013.01); *H04W 56/0075* (2013.01); *H04W 72/14* (2013.01)

(58) Field of Classification Search
CPC ..... H04L 5/0048–0051; H04L 5/0058; H04W 56/0035; H04W 56/0075; H04W 72/042; H04W 72/0446; H04W 72/12; H04W 72/1226; H04W 72/1231; H04W 72/1278; H04W 72/1289; H04W 72/1294; H04W 72/14
See application file for complete search history.

(56) References Cited

U.S. PATENT DOCUMENTS

| | | | |
|---|---|---|---|
| 2018/0213484 A1* | 7/2018 | Oh | H04W 52/42 |
| 2020/0162133 A1* | 5/2020 | Harrison | H04B 7/0456 |
| 2022/0225360 A1* | 7/2022 | Yi | H04W 72/14 |

* cited by examiner

*Primary Examiner* — Pao Sinkantarakorn
(74) *Attorney, Agent, or Firm* — Danai Nelisile Mhembere; Holland & Hart LLP

(57) ABSTRACT

Methods, systems, and devices for wireless communication are described. A first device may receive a grant that schedules a wireless communication between the first device and a second device. The grant may indicate a demodulation reference signal (DMRS) configuration for a set of symbols associated with the wireless communication. The first device may receive control signaling that indicates a phase discontinuity associated with a first subset of symbols of the set of symbols. The first device may receive the wireless communication during a second subset of symbols of the set of symbols based on the DMRS configuration and the indication of the phase discontinuity. The first device may perform channel estimation based on receiving the wireless communication during the second subset of symbols.

30 Claims, 17 Drawing Sheets

PHASE CONTINUITY INDICATION

FIELD OF TECHNOLOGY

The following relates to wireless communication, including techniques for providing a phase continuity indication associated with the wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipments (UEs). Some wireless communications systems may use a repeater device to relay wireless communications between multiple communication devices. For example, a first communication device (e.g., a base station) may communicate with a second communication device (e.g., a UE) via a repeater communication device that relays messages between the first communication device and the second communication device.

SUMMARY

The described techniques relate to improved methods, systems, devices, and apparatuses that support phase continuity indication. Generally, the described techniques provide for mitigating phase discontinuities at a repeater device. A first communication device (e.g., a UE) may receive a grant that schedules a wireless communication between the first communication device and a second communication device (e.g., a base station). The grant may indicate a demodulation reference signal (DMRS) configuration for a set of symbols associated with the wireless communication. The first communication device may receive control signaling that indicates a phase discontinuity associated with a first subset of symbols of the set of symbols. The phase discontinuity may be caused by a third communication device (e.g., a repeater communication device) amplifying and retransmitting the wireless communication. The first communication device may receive the wireless communication during a second subset of symbols of the set of symbols based on the DMRS configuration and the indication of the phase discontinuity. The first communication device may perform channel estimation with improved accuracy based on receiving the wireless communication during the second subset of symbols.

A method for wireless communication at a first device is described. The method may include receiving a grant that schedules the wireless communication between the first device and a second device, the grant indicating a DMRS configuration indicating a set of symbols associated with the wireless communication, receiving control signaling including an indication of a first subset of symbols of the set of symbols associated with a phase discontinuity, receiving the wireless communication during a second subset of symbols of the set of symbols based on the DMRS configuration and the indication of the first subset of symbols of the set of symbols associated with the phase discontinuity, and estimating a channel based on receiving the wireless communication during the second subset of symbols.

An apparatus for wireless communication at a first device is described. The apparatus may include a processor, memory coupled with the processor, and instructions stored in the memory. The instructions may be executable by the processor to cause the apparatus to receive a grant that schedules the wireless communication between the first device and a second device, the grant indicating a DMRS configuration indicating a set of symbols associated with the wireless communication, receive control signaling including an indication of a first subset of symbols of the set of symbols associated with a phase discontinuity, receive the wireless communication during a second subset of symbols of the set of symbols based on the DMRS configuration and the indication of the first subset of symbols of the set of symbols associated with the phase discontinuity, and estimate a channel based on receiving the wireless communication during the second subset of symbols.

Another apparatus for wireless communication at a first device is described. The apparatus may include means for receiving a grant that schedules the wireless communication between the first device and a second device, the grant indicating a DMRS configuration indicating a set of symbols associated with the wireless communication, means for receiving control signaling including an indication of a first subset of symbols of the set of symbols associated with a phase discontinuity, means for receiving the wireless communication during a second subset of symbols of the set of symbols based on the DMRS configuration and the indication of the first subset of symbols of the set of symbols associated with the phase discontinuity, and means for estimating a channel based on receiving the wireless communication during the second subset of symbols.

A non-transitory computer-readable medium storing code for wireless communication at a first device is described. The code may include instructions executable by a processor to receive a grant that schedules the wireless communication between the first device and a second device, the grant indicating a DMRS configuration indicating a set of symbols associated with the wireless communication, receive control signaling including an indication of a first subset of symbols of the set of symbols associated with a phase discontinuity, receive the wireless communication during a second subset of symbols of the set of symbols based on the DMRS configuration and the indication of the first subset of symbols of the set of symbols associated with the phase discontinuity, and estimate a channel based on receiving the wireless communication during the second subset of symbols.

In some examples of the method, apparatuses, and non-transitory computer-readable medium described herein, receiving the control signaling may include operations, features, means, or instructions for receiving a semi-static control message including the indication of the first subset of symbols of the set of symbols associated with the phase discontinuity and where the semi-static control message includes a radio resource control (RRC) configuration message.

In some examples of the method, apparatuses, and non-transitory computer-readable medium described herein, receiving the control signaling may include operations, features, means, or instructions for receiving a dynamic control message including the indication of the first subset of symbols of the set of symbols associated with the phase discontinuity and where the dynamic control message includes a downlink control information (DCI) or a medium access control-control element (MAC-CE).

Some examples of the method, apparatuses, and non-transitory computer-readable medium described herein may further include operations, features, means, or instructions for receiving the control signaling including the indication of the first subset of symbols of the set of symbols associated with the phase discontinuity based on a periodicity.

Some examples of the method, apparatuses, and non-transitory computer-readable medium described herein may further include operations, features, means, or instructions for receiving the control signaling including the indication of the first subset of symbols of the set of symbols associated with the phase discontinuity based on a semi-persistent scheduling of the control signaling.

Some examples of the method, apparatuses, and non-transitory computer-readable medium described herein may further include operations, features, means, or instructions for determining, based on the indication, one or more of a respective symbol location for each respective symbol of the first subset of symbols of the set of symbols associated with the phase discontinuity or a respective symbol duration for each respective symbol of the first subset of symbols of the set of symbols associated with the phase discontinuity and where receiving the wireless communication during the second subset of symbols of the set of symbols may be based on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

Some examples of the method, apparatuses, and non-transitory computer-readable medium described herein may further include operations, features, means, or instructions for determining, based on the indication, one or more transmission time intervals (TTIs) associated with the first subset of symbols of the set of symbols associated with the phase discontinuity, the one or more TTIs including one or more slots and where receiving the wireless communication during the second subset of symbols of the set of symbols may be based on determining the one or more TTIs associated with the first subset of symbols of the set of symbols associated with the phase discontinuity.

Some examples of the method, apparatuses, and non-transitory computer-readable medium described herein may further include operations, features, means, or instructions for determining, based on the indication, a communication direction associated with the wireless communication, the communication direction corresponding to an uplink direction or a downlink direction and where receiving the wireless communication during the second subset of symbols of the set of symbols may be based on determining the communication direction associated with the wireless communication.

Some examples of the method, apparatuses, and non-transitory computer-readable medium described herein may further include operations, features, means, or instructions for determining, based on the indication, a resource type associated with the first subset of symbols of the set of symbols associated with the phase discontinuity, the resource type indicating a half-duplex type resource or a full-duplex type resource and where receiving the wireless communication during the second subset of symbols of the set of symbols may be based on determining the resource type.

Some examples of the method, apparatuses, and non-transitory computer-readable medium described herein may further include operations, features, means, or instructions for determining, based on the indication, a beam direction associated with the first subset of symbols of the set of symbols associated with the phase discontinuity and where receiving the wireless communication during the second subset of symbols of the set of symbols may be based on determining the beam direction associated with the first subset of symbols of the set of symbols associated with the phase discontinuity.

Some examples of the method, apparatuses, and non-transitory computer-readable medium described herein may further include operations, features, means, or instructions for determining, based on the indication, quasi-colocation (QCL) information associated with the wireless communication and where receiving the wireless communication during the second subset of symbols of the set of symbols may be based on determining the QCL information associated with the wireless communication.

Some examples of the method, apparatuses, and non-transitory computer-readable medium described herein may further include operations, features, means, or instructions for adjusting a parameter associated with a receiver of the UE based on the indication of the phase discontinuity and where receiving the wireless communication during the second subset of symbols of the set of symbols may be based on adjusting the parameter associated with the receiver of the UE.

In some examples of the method, apparatuses, and non-transitory computer-readable medium described herein, the parameter includes a channel estimation algorithm or a frequency offset estimation algorithm.

Some examples of the method, apparatuses, and non-transitory computer-readable medium described herein may further include operations, features, means, or instructions for receiving capability information associated with the second device or a third device, the capability information indicating the phase discontinuity.

Some examples of the method, apparatuses, and non-transitory computer-readable medium described herein may further include operations, features, means, or instructions for receiving second control signaling indicating a measurement configuration, the measurement configuration indicating a threshold corresponding to phase continuity; performing a set of phase continuity measurements based at least in part on the measurement configuration; and transmitting a measurement report that indicates the set of phase continuity measurements, wherein receiving the control signaling is based at least in part on transmitting the measurement report.

Some examples of the method, apparatuses, and non-transitory computer-readable medium described herein may further include operations, features, means, or instructions for determining the phase discontinuity associated with the wireless communication from the second device based on a phase difference associated with the wireless communication satisfying a threshold.

In some examples of the method, apparatuses, and non-transitory computer-readable medium described herein, the wireless communication corresponds to a density of DMRS satisfying a density threshold.

In some examples of the method, apparatuses, and non-transitory computer-readable medium described herein, one or more of the first device or the second device include a UE, a repeater device, or a base station, or any combination thereof.

A method for wireless communication at a first device is described. The method may include transmitting a grant that schedules the wireless communication between the first device and a second device, the grant indicating a DMRS configuration indicating a set of symbol durations associated with the wireless communication, determining a phase discontinuity associated with a first subset of symbol durations of the set of symbol durations, transmitting control signaling indicating the first subset of symbol durations of the set of symbol durations associated with the phase discontinuity, and transmitting the wireless communication during a second subset of symbol durations of the set of symbol durations based on the DMRS configuration and the phase discontinuity associated with the first subset of symbol durations.

An apparatus for wireless communication at a first device is described. The apparatus may include a processor, memory coupled with the processor, and instructions stored in the memory. The instructions may be executable by the processor to cause the apparatus to transmit a grant that schedules the wireless communication between the first device and a second device, the grant indicating a DMRS configuration indicating a set of symbol durations associated with the wireless communication, determine a phase discontinuity associated with a first subset of symbol durations of the set of symbol durations, transmit control signaling indicating the first subset of symbol durations of the set of symbol durations associated with the phase discontinuity, and transmit the wireless communication during a second subset of symbol durations of the set of symbol durations based on the DMRS configuration and the phase discontinuity associated with the first subset of symbol durations.

Another apparatus for wireless communication at a first device is described. The apparatus may include means for transmitting a grant that schedules the wireless communication between the first device and a second device, the grant indicating a DMRS configuration indicating a set of symbol durations associated with the wireless communication, means for determining a phase discontinuity associated with a first subset of symbol durations of the set of symbol durations, means for transmitting control signaling indicating the first subset of symbol durations of the set of symbol durations associated with the phase discontinuity, and means for transmitting the wireless communication during a second subset of symbol durations of the set of symbol durations based on the DMRS configuration and the phase discontinuity associated with the first subset of symbol durations.

A non-transitory computer-readable medium storing code for wireless communication at a first device is described. The code may include instructions executable by a processor to transmit a grant that schedules the wireless communication between the first device and a second device, the grant indicating a DMRS configuration indicating a set of symbol durations associated with the wireless communication, determine a phase discontinuity associated with a first subset of symbol durations of the set of symbol durations, transmit control signaling indicating the first subset of symbol durations of the set of symbol durations associated with the phase discontinuity, and transmit the wireless communication during a second subset of symbol durations of the set of symbol durations based on the DMRS configuration and the phase discontinuity associated with the first subset of symbol durations.

In some examples of the method, apparatuses, and non-transitory computer-readable medium described herein, transmitting the control signaling may include operations, features, means, or instructions for transmitting a semi-static control message including the indication of the first subset of symbols of the set of symbols associated with the phase discontinuity and where the semi-static control message includes an RRC configuration message.

In some examples of the method, apparatuses, and non-transitory computer-readable medium described herein, transmitting the control signaling may include operations, features, means, or instructions for transmitting a dynamic control message including the indication of the first subset of symbols of the set of symbols associated with the phase discontinuity and where the dynamic control message includes a DCI or a MAC-CE.

Some examples of the method, apparatuses, and non-transitory computer-readable medium described herein may further include operations, features, means, or instructions for transmitting the control signaling including the indication of the first subset of symbols of the set of symbols associated with the phase discontinuity based on a periodicity.

Some examples of the method, apparatuses, and non-transitory computer-readable medium described herein may further include operations, features, means, or instructions for transmitting the control signaling including the indication of the first subset of symbols of the set of symbols associated with the phase discontinuity based on a semi-persistent scheduling of the control signaling.

Some examples of the method, apparatuses, and non-transitory computer-readable medium described herein may further include operations, features, means, or instructions for determining one or more of a respective symbol location for each respective symbol of the first subset of symbols of the set of symbols associated with the phase discontinuity or a respective symbol duration for each respective symbol of the first subset of symbols of the set of symbols associated with the phase discontinuity and where transmitting the wireless communication during the second subset of symbols of the set of symbols may be based on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

Some examples of the method, apparatuses, and non-transitory computer-readable medium described herein may further include operations, features, means, or instructions for determining one or more TTIs associated with the first subset of symbols of the set of symbols associated with the phase discontinuity, the one or more TTIs including one or more slots and where transmitting the wireless communication during the second subset of symbols of the set of symbols may be based on determining the one or more TTIs associated with the first subset of symbols of the set of symbols associated with the phase discontinuity.

Some examples of the method, apparatuses, and non-transitory computer-readable medium described herein may further include operations, features, means, or instructions for determining a communication direction associated with the wireless communication, the communication direction corresponding to an uplink direction or a downlink direction and where transmitting the wireless communication during the second subset of symbols of the set of symbols may be based on determining the communication direction associated with the wireless communication.

Some examples of the method, apparatuses, and non-transitory computer-readable medium described herein may further include operations, features, means, or instructions for determining a resource type associated with the first subset of symbols of the set of symbols associated with the phase discontinuity, the resource type indicating a half-duplex type resource or a full-duplex type resource and where transmitting the wireless communication during the second subset of symbols of the set of symbols may be based on determining the resource type.

Some examples of the method, apparatuses, and non-transitory computer-readable medium described herein may further include operations, features, means, or instructions for receiving capability information associated with the second device or a third device, wherein determining the phase discontinuity is based at least in part on receiving the capability information.

DETAILED DESCRIPTION

Figure 1:
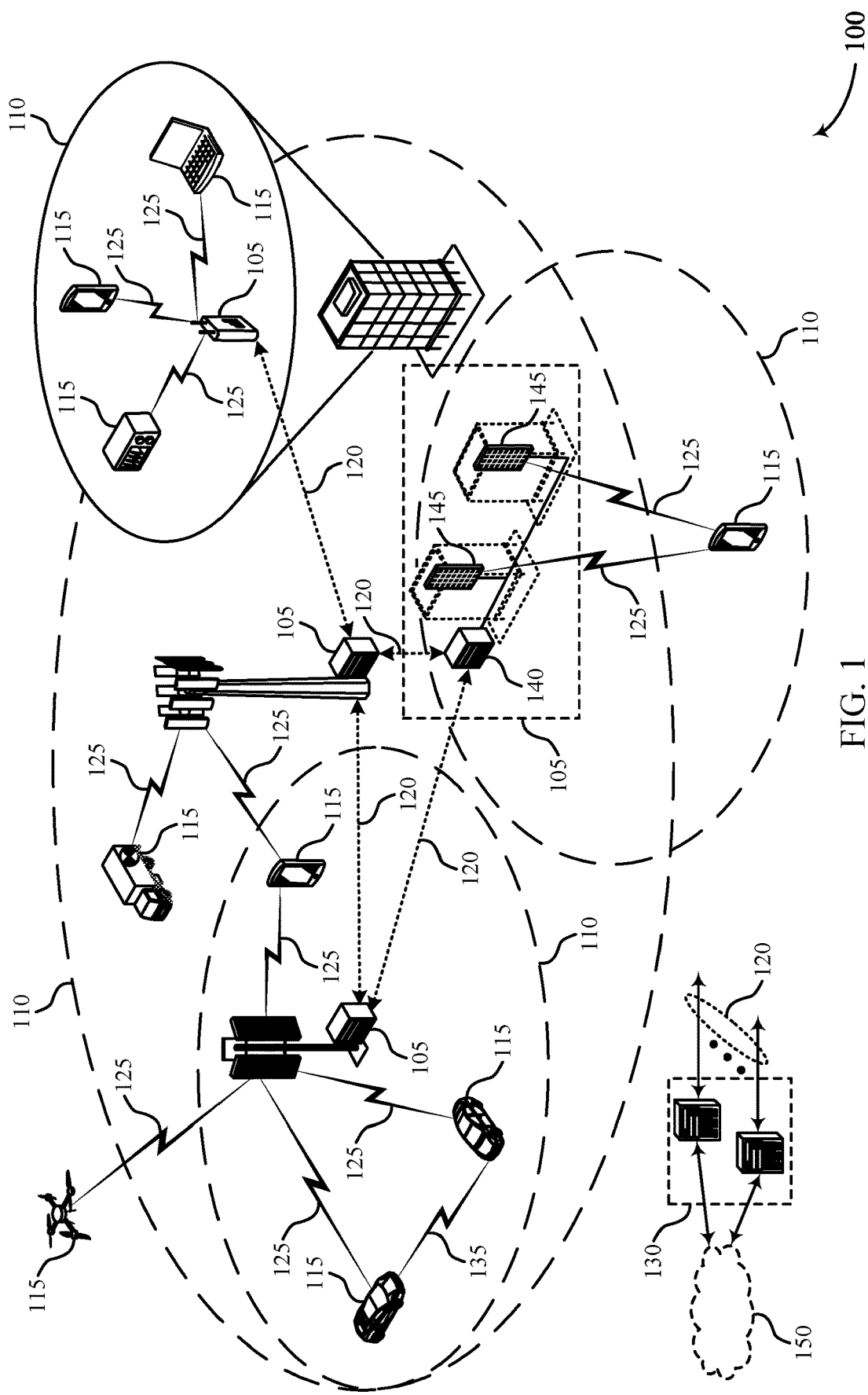
FIGS. 1 and 2 illustrate examples of wireless communications systems in accordance with aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. In the wireless communications system, a communication device, such as a base station may communicate with another communication device, such as a UE using a relay node (e.g., a repeater communication device or a reflector). For example, if the base station transmits a signal to the UE, the repeater communication device may amplify and retransmit the signal such that the UE has a higher likelihood of successfully receiving the signal. The repeater communication device may use a configuration (e.g., a beam configuration, a power configuration) to retransmit the signal. In some cases, however, the repeater communication device may switch configurations while retransmitting the signal, which may alter a phase of the retransmitted signal. As such, the retransmitted signal may arrive at the UE with a phase discontinuity, which may reduce the likelihood of successful communications between the base station and the UE.

Various aspects of the present disclosure relate to providing a phase continuity indication to increase the likelihood of successful communications between the base station and the UE. For example, the base station may identify a phase discontinuity at the repeater communication device and may schedule communications with the UE based on the identified phase discontinuity. The base station may identify the phase discontinuity based on performing a set of measurements associated with the repeater communication device. Alternatively, the base station may identify the phase discontinuity based on receiving a report from the repeater communication device. The base station may determine a set of scheduling parameters for a subsequent message (e.g., an uplink message or a downlink message) based on identifying the phase discontinuity. Using the determined set of scheduling parameters may enable the base station and the UE to mitigate the identified phase discontinuity and communicate with improved reliability, among other benefits.

The base station may transmit an indication of the identified phase discontinuity to the UE. For example, the base station may indicate if there is a phase discontinuity, locations and durations of time resources (e.g., sub-symbols, symbols, slots) affected by the phase discontinuity, a communication direction (e.g., uplink or downlink) impacted by the phase discontinuity, a beam direction associated with the phase discontinuity, or other communication parameters related to the phase discontinuity. In some examples, the base station and the UE may adjust a channel estimation algorithm or a frequency offset estimation algorithm based on identifying the phase discontinuity.

Aspects of the present disclosure may be implemented to realize one or more of the following advantages. The described techniques may enable the base station and the UE to communicate (e.g., via the repeater communication device) with improved reliability based on mitigating potential phase discontinuities at the repeater communication device. For example, the base station may schedule a subsequent message based on identifying a potential phase discontinuity at the repeater communication device. The determined set of scheduling parameters may enable the base station and the UE to perform channel estimation and frequency offset estimation with greater accuracy, which may improve the reliability of communications between the base station and the UE.

Aspects of the disclosure are initially described in the context of wireless communications systems and process flows. Aspects of the disclosure are further illustrated by and described with reference to apparatus diagrams, system diagrams, and flowcharts that relate to phase continuity indications.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include one or more relay nodes (e.g., an IAB node), which may decode and retransmit (e.g., forward) signals between communication devices (e.g., between a UE 115 and a base station 105), in the wireless communications system 100. Other relay nodes (e.g., repeater communication devices) may amplify and retransmit signals between the communication devices. These repeater communication devices may be cost-effective devices that can improve network coverage in the wireless communications system 100. In some cases, side information may improve the performance of a relay node, such as a repeater communication device or a reflector, or both. As an example, side information may include timing information (e.g., slot boundaries, symbol boundaries, subframe boundaries, or frame boundaries), TDD configuration information (e.g., uplink and downlink designations), scheduling information (e.g., ON-OFF information), spatial information (e.g., for beam management), or a combination thereof.

In some cases, the wireless communications system 100 may support different types of repeater communication devices. For example, a first type of repeater communication device (e.g., a traditional repeater device) may operate without any side information. A second type of repeater communication device (e.g., an autonomous smart repeater device) may acquire or determine side information autonomously. For example, the second type of repeater communication device may acquire side information based on receiving or decoding broadcast transmissions (e.g., from a base station 105). A third type of repeater communication device (e.g., a network-controlled repeater device) may be configured or controlled (e.g., by a base station 105) with side information via an established control interface. In some cases, the third type of repeater communication device may receive (e.g., be provided) all side information from a base station 105. In other cases, the third type of repeater communication device may be configured (e.g., by a base station 105) with some side information and may acquire other side information based on receiving or decoding broadcast transmissions from a base station 105. Configuring some side information and acquiring other side information may reduce processing overhead and latency associated with the side information.

Some types of repeater communication devices (e.g., the first type of repeater communication device or the second type of repeater communication device) may be deployed in a transparent manner with respect to network nodes (e.g., UEs 115 or base stations 105). That is, some repeater communication devices may be configured to autonomously amplify and retransmit signals between the network nodes (e.g., without a request from the network nodes). To enable these repeater communication devices to operate autonomously (e.g., transparently) and ensure that the repeater communication devices attain a desired performance level, some settings of the repeater communication devices may be manually configured at the time of deployment and other settings may be autonomously reconfigured by the repeater communication devices at a later time (e.g., based on side information). As a result, the network nodes may experience higher signal strength and greater cell coverage without explicitly configuring the repeater communication devices.

A repeater communication device may autonomously adjust a configuration (e.g., beam settings, power settings) while the repeater communication device is amplifying and retransmitting a signal between communication devices in the wireless communications system 100. Adjusting (e.g., modifying) the configuration may lead to a phase discontinuity (e.g., a random phase) in the retransmitted signal. For example, if the repeater communication device retransmits a first portion of the signal using a first configuration and retransmits a second portion of the signal using a second configuration that is different from the first configuration, there may be a phase difference between the first portion of the retransmitted signal and the second portion of the retransmitted signal. This phase difference may result in a loss of phase continuity across the first and second portions of the retransmitted signal. As such, if the wireless nodes attempt to perform channel estimation or frequency offset estimation based on the retransmitted signal (e.g., by assuming phase continuity across the first and second portions of the retransmitted signal), the communication devices may derive incorrect channel estimates or frequency offset estimates, which may decrease the likelihood of successful communications between the communication devices.

In various aspects of the present disclosure, if a control node (e.g., a base station 105) identifies a potential phase discontinuity at a repeater communication device, the control node may reduce adverse effects of the potential phase discontinuity on a subsequent message (e.g., a downlink message or an uplink message) based on determining a set of scheduling parameters for the subsequent message. For example, the control node may determine one or more of a resource allocation, a data rate, an MCS, a rank, or a DMRS configuration for the subsequent message based on the identified phase discontinuity. Using the determined set of scheduling parameters may improve the likelihood of successful communications between the control node and other network nodes in the wireless communications system 100.

Figure 2:
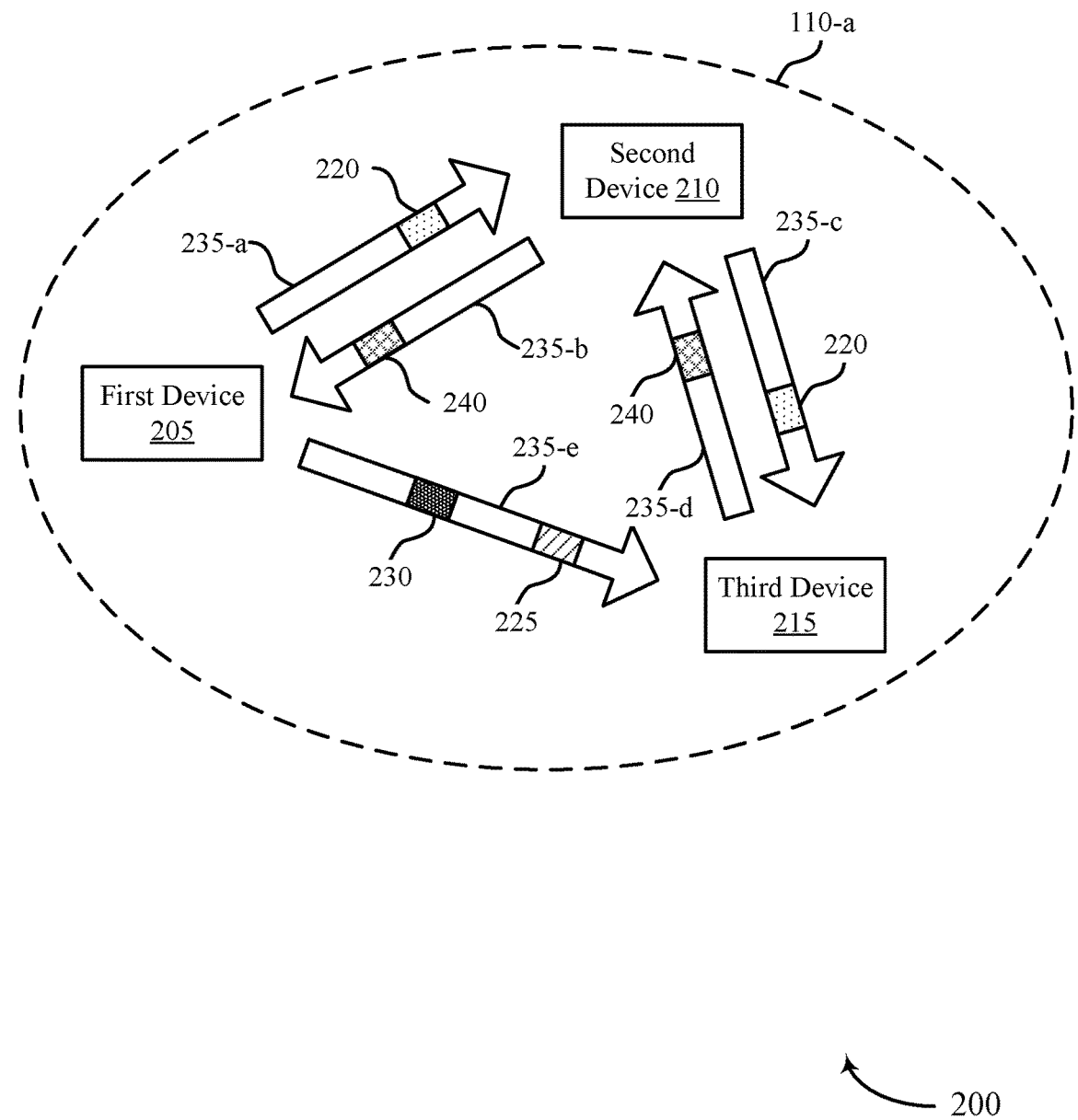

FIG. 2 illustrates an example of a wireless communications system 200 in accordance with aspects of the present disclosure. The wireless communications system may implement or be implemented by one or more aspects of the wireless communications system 100. For example, the wireless communications system 200 may include a first device 205 and a third device 215, which may be examples of a base station 105 and a UE 115 described with reference to FIG. 1. The wireless communications system 200 may also include a second device 210 (e.g., a repeater device), which may amplify and retransmit messages between the first device 205 and the third device 215. The first device 205, the second device 210, and the third device 215 may communicate within a geographic coverage area 110-a, which may be an example of a geographic coverage area 110 described with reference to FIG. 1. In the example of FIG. 2, the first device 205 may schedule communications with the third device 215 based on identifying a phase discontinuity at the second device 210.

In some cases, the second device 210 may amplify and retransmit messages between the first device 205 and the third device 215. For example, if the first device transmits a downlink message 220 via a communication link 235-a, the second device 210 may amplify and retransmit the downlink message 220 via a communication link 235-c. Similarly, if the third device 215 transmits an uplink message 240 via a communication link 235-d, the second device 210 may retransmit the uplink message 240 via a communication link 235-b. Additionally or alternatively, the first device 205 may communicate with the third device 215 directly (e.g., without the second device 210) via a communication link 235-e. The second device 210 may adjust one or more configuration settings (e.g., power settings, beam settings) while relaying (e.g., forwarding) messages between the first device 205 and the third device 215, as described with reference to FIG. 1. For example, the second device 210 may retransmit a first portion of the downlink message 220 using a first transmit beam and may retransmit a second portion of the downlink message 220 using a second transmit beam. Using different transmit beams may lead to a phase discontinuity between the first and second portions of the downlink message 220. This phase discontinuity may prevent the third device 215 from successfully performing channel estimation, frequency offset estimation, or both.

To reduce adverse effects of the phase discontinuity on communications between the first device 205 and the third device 215, the first device 205 (e.g., a control node) may identify the phase discontinuity and schedule communications with the third device 215 accordingly. For example, if the first device 205 determines that the phase discontinuity may impact (e.g., interrupt) a first set of symbols (or sub-symbols), the first device 205 may schedule communications with third device 215 in a second set of symbols that is different from the first set of interrupted symbols. Additionally or alternatively, the first device 205 may determine one or more of a resource allocation (e.g., a time span), a data rate (e.g., a modulation and coding scheme (MCS) or a rank), or a DMRS configuration (e.g., a number of DMRS symbols and corresponding locations) for the scheduled communications based on identifying the phase discontinuity. Configuring a sufficient number of DMRS symbols for the scheduled communications may enable the first device 205 and the third device 215 to perform proper channel estimation in different (e.g., uninterrupted) portions of the scheduled communications. The third device 215 or the first device 205 may also adjust one or more reception algorithms (e.g., a channel estimation algorithm, a frequency offset estimation algorithm) to mitigate the phase discontinuity.

The first device 205 (or another wireless node in the wireless communications system 200) may detect the phase discontinuity based on performing a set of measurements (e.g., observations) associated with the second device 210. For example, the first device 205 may detect the phase discontinuity based on measuring a phase difference between signals transmitted by the second device 210. In other examples, the first device 205 may detect the phase discontinuity based on receiving a report from the second device 210. For example, the second device 210 may indicate phase continuity information to the first device 205 via a capability report. More specifically, the capability report may indicate whether the second device 210 is maintaining phase continuity or not. In some examples, the capability report may be based on a preconfigured phase continuity threshold. Additionally or alternatively, the first device may receive phase continuity information associated with the second device 210 from another management entity in the wireless communications system 200.

In some examples, the first device 205 may transmit control signaling 230 to the third device 215 that indicates the phase discontinuity. For example, the control signaling 230 may indicate if there is a phase discontinuity at the second device 210, locations and corresponding durations of interrupted time resources (e.g., sub-symbols, symbols, slots), communication directions (e.g., uplink or downlink) or resource types (e.g., flexible or full-duplex) affected by the phase discontinuity, beam directions or associated quasi co-located (QCL) reference signals impacted by the phase discontinuity, or other communication parameters associated with the phase discontinuity. The first device 205 may transmit the control signaling 230 to the third device 215 in a semi-static manner (e.g., via RRC signaling), a dynamic manner (e.g., via a DCI message or a MAC-control element (CE)), a periodic manner, or a semi-persistent manner. In some examples, the first device 205 may receive an indication of similar phase continuity information from another wireless node in the wireless communications system 200 (e.g., from the second device 210, the third device 215, or another management entity).

The first device 205 may identify the phase discontinuity before or after transmitting a scheduling grant 225 to the third device 215. In some examples, the scheduling grant 225 may schedule the uplink message 240 from the third device 215 to the first device 205. To mitigate the phase discontinuity, the first device 205 may configure a relatively large number of DMRS symbols (e.g., a relatively high DMRS density) for the uplink message 240. The first device 205 may also implement various channel estimation techniques to improve the likelihood of successfully receiving the uplink message from the third device 215 via the second device 210. In such examples (e.g., for uplink scheduling), the first device 205 may mitigate the phase discontinuity without transmitting an indication of the phase discontinuity to the third device 215. That is, the first device 205 may mitigate the phase discontinuity in a transparent manner (e.g., with respect to the third device 215).

In other examples, the scheduling grant 225 may schedule the downlink message 220 from the first device 205 to the third device 215. To mitigate the phase discontinuity, the first device 205 may configure a relatively large number of DMRS symbols for the downlink message 220. In addition, the first device 205 may transmit an indication to the third device 215 of phase continuity conditions related to the downlink message 220. The third device 215 may use the indicated phase continuity conditions to configure one or more receiver components at the third device 215, which may increase the likelihood of the third device 215 successfully receiving the downlink message 220.

The described techniques may enable the third device 215 and the first device 205 to exchange messages (e.g., via the second device 210) with improved reliability. More specifically, the described techniques may enable the first device 205 and the third device 215 to perform channel estimation and frequency offset estimation with improved accuracy based on identifying potential phase discontinuities at the second device 210 and scheduling communications accordingly.

Figure 3:
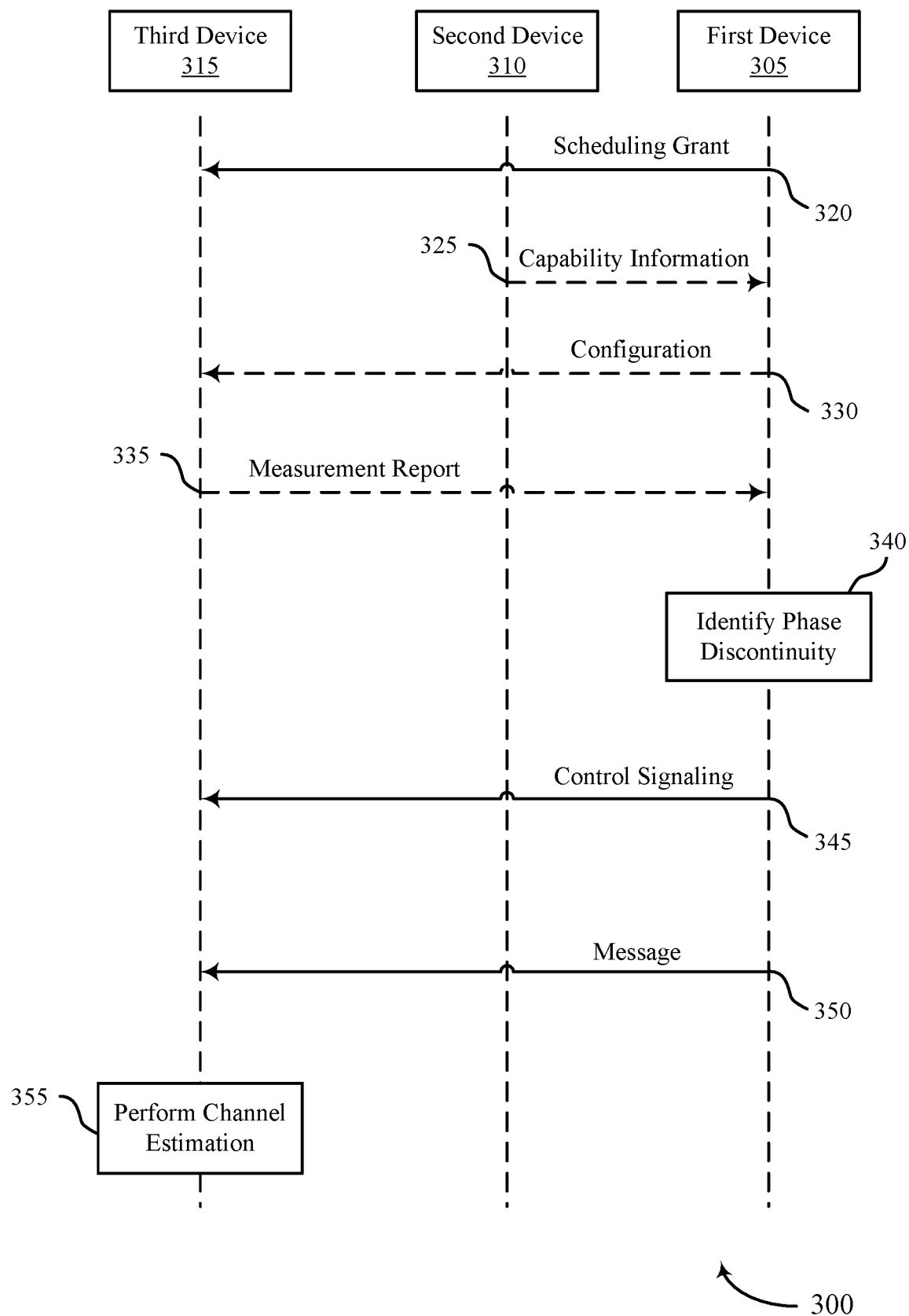
FIG. 3 illustrates an example of a process flow in accordance with aspects of the present disclosure.

FIG. 3 illustrates an example of a process flow 300 in accordance with aspects of the present disclosure. The process flow 300 may implement or be implemented by one or more aspects of the wireless communications systems 100 or 200. For example, the process flow 300 may include a first device 305 and a third device 315, which may be examples of a base station 105 and a UE 115 described with reference to FIG. 1. The process flow may also include a second device 310 (e.g., a repeater or a reflector), which may be an example of a second device 210 described with reference to FIG. 2. In the following description of the process flow 300, operations between the first device 305, the second device 310, and the third device 315 may occur in a different order or at different times than as shown. Some operations may also be omitted from the process flow 300, and other operations may be added to the process flow 300. In the example of FIG. 3, the first device 305 may schedule one or more communications with the third device 315 based on identifying a potential phase discontinuity at the second device 310.

At 320, the first device 305 may transmit a grant to the third device 315. The grant may schedule a subsequent message (e.g., a downlink message or an uplink message) in a set of symbols. The grant may also indicate a DMRS configuration associated with the set of symbols. In some examples, the DMRS configuration may indicate a number of DMRS symbols in the set of symbols. In some examples, the number of DMRS symbols in the set of symbols may satisfy a DMRS density threshold.

In some examples, the second device 310 may transmit capability information to the first device 305 at 325. The capability information may indicate a capability of the second device 310 to maintain phase continuity while forwarding messages between the first device 305 and the third device 315. Additionally or alternatively, the capability information may indicate locations and durations (e.g., TTIs), communication directions (e.g., uplink or downlink), resource types (e.g., half-duplex, full duplex, or flexible), beam directions, QCL information, or a combination thereof associated with phase continuity.

In some examples, the first device 305 may transmit an indication of a measurement configuration to the third device 315 at 330. The measurement configuration may include a phase continuity threshold. The third device 315 may perform a set of phase continuity measurements based on receiving the indication of the measurement configuration. Specifically, the third device 315 may measure if messages forwarded from the second device 310 satisfy the phase continuity threshold. In some examples, the third device 315 may transmit a measurement report to the first device 305 at 335 based on performing the set of phase continuity measurements. The measurement report may indicate whether messages forwarded from the second device 310 satisfy the phase continuity threshold.

At 340, the first device 305 may identify a phase discontinuity associated with the second device 310. In some examples, the first device 305 may identify the phase discontinuity based on receiving the capability information from the second device 310. In other examples, the first device 305 may identify the phase discontinuity based on measuring a phase difference associated with the second device 310 and determining that the measured phase difference satisfies the phase continuity threshold.

At 345, the first device 305 may transmit control signaling to the third device 315. The control signaling may indicate a first subset of symbols (e.g., of the set of symbols) affected by the phase discontinuity. More specifically, the control signaling may indicate locations and durations (e.g., TTIs), communication directions (e.g., uplink or downlink), resource types (e.g., half-duplex, full duplex, or flexible), beam directions, QCL information, or a combination thereof associated with the first subset of symbols. In some examples, the control signaling may include a semi-static control message (e.g., an RRC configuration message), a dynamic control message (e.g., a DCI message or a MAC-CE), or a combination thereof. Additionally or alternatively, the first device 305 may transmit the control signaling to the third device 315 in a periodic manner or a semi-persistent manner.

At 350, the first device 305 may transmit a message to the third device 315. The first device 305 may transmit the message to the third device 315 in a second subset of symbols (e.g., of the set of symbols) that is different from the first subset of symbols. The third device 315 may receive the message based on the grant and the control signaling, as described with reference to FIG. 2. In some examples, the third device 315 may receive the message from the first device 305 via the second device 310.

At 355, the third device 340 may perform channel estimation based on receiving the message from the first device 305 in the second subset of symbols. In some examples, the third device 315 may perform the channel estimation based on adjusting a channel estimation algorithm or a frequency offset algorithm. Aspects of the process flow 300 may enable the third device 315 and the first device 305 to exchange messages (e.g., via the second device 310) with improved reliability. More specifically, aspects of the process flow 300 may enable the third device 315 to perform channel estimation and frequency offset estimation with improved accuracy based on the first device 305 identifying potential phase discontinuities at the second device 310 and scheduling communications accordingly.

Figure 4:
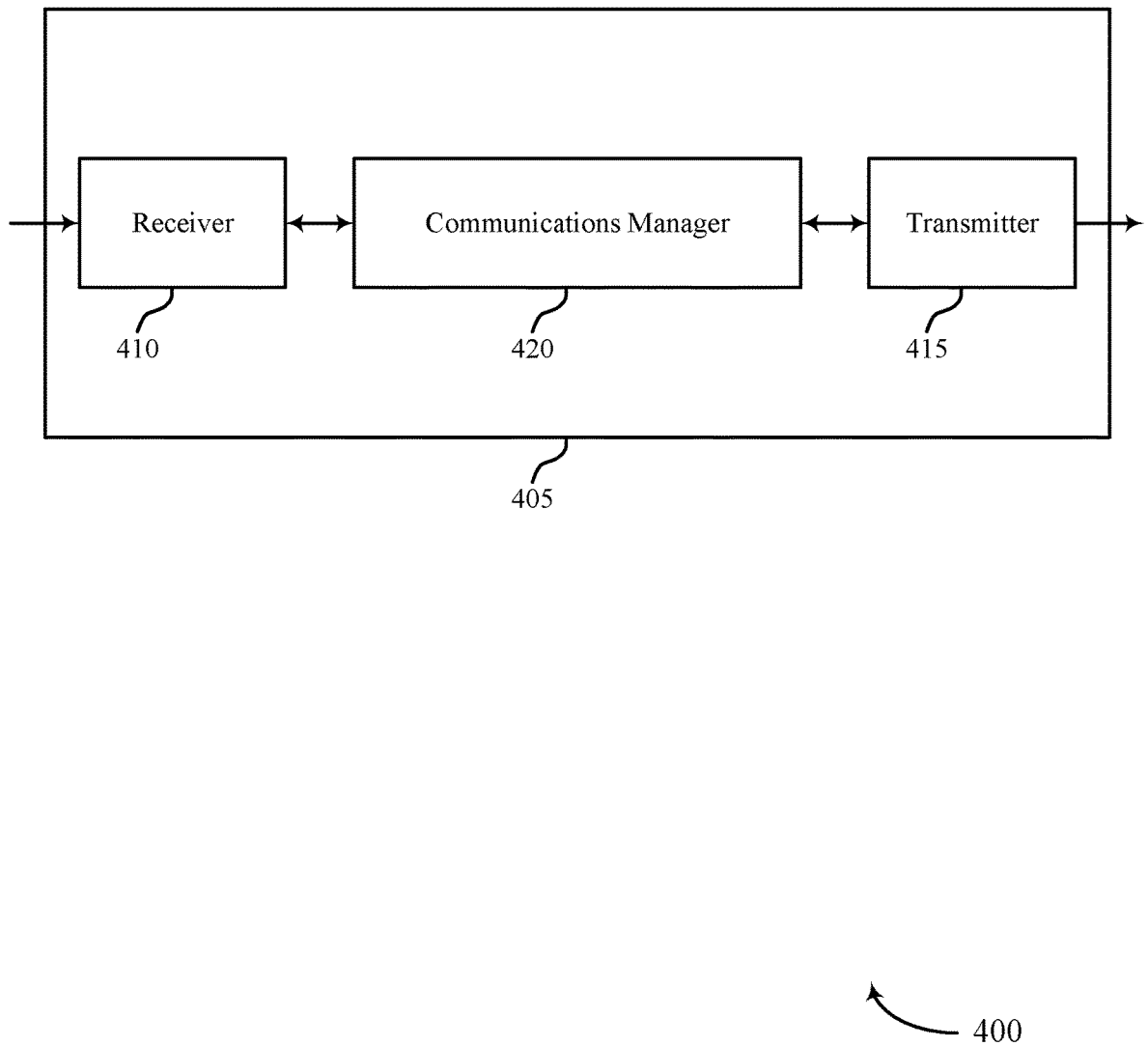
FIGS. 4 and 5 show block diagrams of devices in accordance with aspects of the present disclosure.

FIG. 4 shows a block diagram 400 of a device 405 in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to providing phase continuity indications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to providing phase continuity indications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of providing phase continuity indications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first device (e.g., the device 405) in accordance with examples as disclosed herein. For example, the communications manager 420 may be configured as or otherwise support a means for receiving a grant that schedules the wireless communication between the first device and a second device, the grant indicating a DMRS configuration indicating a set of symbols associated with the wireless communication. The communications manager 420 may be configured as or otherwise support a means for receiving control signaling including an indication of a first subset of symbols of the set of symbols associated with a phase discontinuity. The communications manager 420 may be configured as or otherwise support a means for receiving the wireless communication during a second subset of symbols of the set of symbols based on the DMRS configuration and the indication of the first subset of symbols of the set of symbols associated with the phase discontinuity. The communications manager 420 may be configured as or otherwise support a means for estimating a channel based on receiving the wireless communication during the second subset of symbols.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption at the device 405. For example, the described techniques may enable the device 405 (e.g., a UE 115) to perform wireless communications with improved reliability based on mitigating potential phase continuities at a repeater device. As a result, the device 405 may request fewer retransmissions and may spend more time in sleep mode, which may reduce power consumption at the device 405.

Figure 5:
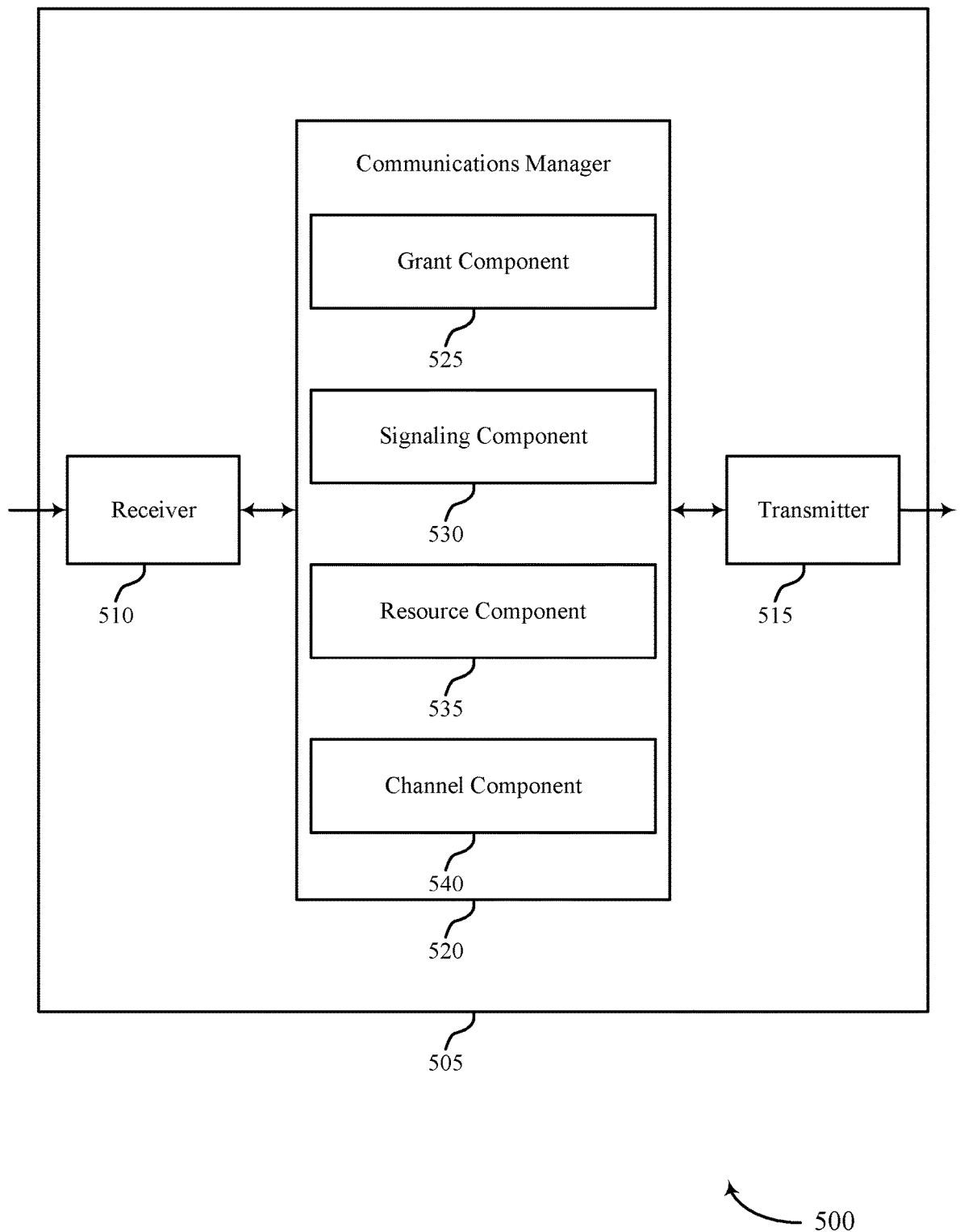

FIG. 5 shows a block diagram 500 of a device 505 in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to providing phase continuity indications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to providing phase continuity indications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of providing phase continuity indications as described herein. For example, the communications manager 520 may include a grant component 525, a signaling component 530, a resource component 535, a channel component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device (e.g., the device 505) in accordance with examples as disclosed herein. The grant component 525 may be configured as or otherwise support a means for receiving a grant that schedules the wireless communication between the first device and a second device, the grant indicating a DMRS configuration indicating a set of symbols associated with the wireless communication. The signaling component 530 may be configured as or otherwise support a means for receiving control signaling including an indication of a first subset of symbols of the set of symbols associated with a phase discontinuity. The resource component 535 may be configured as or otherwise support a means for receiving the wireless communication during a second subset of symbols of the set of symbols based on the DMRS configuration and the indication of the first subset of symbols of the set of symbols associated with the phase discontinuity. The channel component 540 may be configured as or otherwise support a means for estimating a channel based on receiving the wireless communication during the second subset of symbols.

Figure 6:
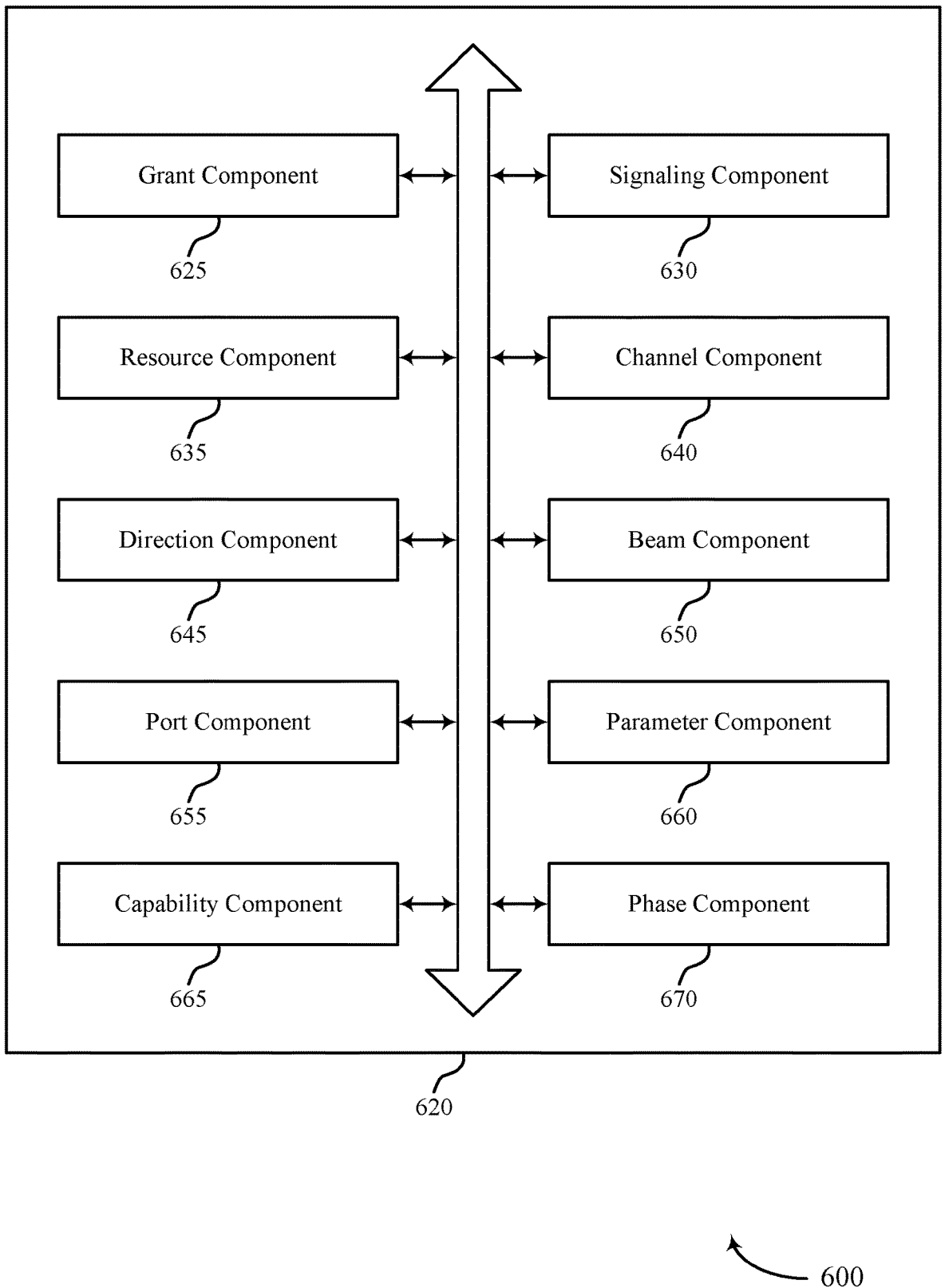
FIG. 6 shows a block diagram of a communications manager in accordance with aspects of the present disclosure.

FIG. 6 shows a block diagram 600 of a communications manager 620 in accordance with aspects of the present disclosure. The communications manager 620 may be an example of aspects of a communications manager 420, a communications manager 520, or both, as described herein. The communications manager 620, or various components thereof, may be an example of means for performing various aspects of providing phase continuity indications as described herein. For example, the communications manager 620 may include a grant component 625, a signaling component 630, a resource component 635, a channel component 640, a direction component 645, a beam component 650, a port component 655, a parameter component 660, a capability component 665, a phase component 670, or any combination thereof. Each of these components may communicate, directly or indirectly, with one another (e.g., via one or more buses).

The communications manager 620 may support wireless communication at a first device in accordance with examples as disclosed herein. The grant component 625 may be configured as or otherwise support a means for receiving a grant that schedules the wireless communication between the first device and a second device, the grant indicating a DMRS configuration indicating a set of symbols associated with the wireless communication. The signaling component 630 may be configured as or otherwise support a means for receiving control signaling including an indication of a first subset of symbols of the set of symbols associated with a phase discontinuity. The resource component 635 may be configured as or otherwise support a means for receiving the wireless communication during a second subset of symbols of the set of symbols based on the DMRS configuration and the indication of the first subset of symbols of the set of symbols associated with the phase discontinuity. The channel component 640 may be configured as or otherwise support a means for estimating a channel based on receiving the wireless communication during the second subset of symbols.

In some examples, to support receiving the control signaling, the signaling component 630 may be configured as or otherwise support a means for receiving a semi-static control message including the indication of the first subset of symbols of the set of symbols associated with the phase discontinuity. In some examples, the semi-static control message includes an RRC configuration message. In some examples, to support receiving the control signaling, the signaling component 630 may be configured as or otherwise support a means for receiving a dynamic control message including the indication of the first subset of symbols of the set of symbols associated with the phase discontinuity. In some examples, the dynamic control message includes a DCI or a MAC-CE.

In some examples, the signaling component 630 may be configured as or otherwise support a means for receiving the control signaling including the indication of the first subset of symbols of the set of symbols associated with the phase discontinuity based on a periodicity. In some examples, the signaling component 630 may be configured as or otherwise support a means for receiving the control signaling including the indication of the first subset of symbols of the set of symbols associated with the phase discontinuity based on a semi-persistent scheduling of the control signaling.

In some examples, the resource component 635 may be configured as or otherwise support a means for determining, based on the indication, one or more of a respective symbol location for each respective symbol of the first subset of symbols of the set of symbols associated with the phase discontinuity or a respective symbol duration for each respective symbol of the first subset of symbols of the set of symbols associated with the phase discontinuity. In some examples, the resource component 635 may be configured as or otherwise support a means for receiving the wireless communication during the second subset of symbols of the set of symbols based on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

In some examples, the resource component 635 may be configured as or otherwise support a means for determining, based on the indication, one or more TTIs associated with the first subset of symbols of the set of symbols associated with the phase discontinuity, the one or more TTIs including one or more slots. In some examples, the resource component 635 may be configured as or otherwise support a means for receiving the wireless communication during the second subset of symbols of the set of symbols based on determining the one or more TTIs associated with the first subset of symbols of the set of symbols associated with the phase discontinuity. In some examples, the direction component 645 may be configured as or otherwise support a means for determining, based on the indication, a communication direction associated with the wireless communication, the communication direction corresponding to an uplink direction or a downlink direction. In some examples, the resource component 635 may be configured as or otherwise support a means for receiving the wireless communication during the second subset of symbols of the set of symbols based on determining the communication direction associated with the wireless communication.

In some examples, the resource component 635 may be configured as or otherwise support a means for determining, based on the indication, a resource type associated with the first subset of symbols of the set of symbols associated with the phase discontinuity, the resource type indicating a half-duplex type resource or a full-duplex type resource. In some examples, the resource component 635 may be configured as or otherwise support a means for receiving the wireless communication during the second subset of symbols of the set of symbols based on determining the resource type. In some examples, the beam component 650 may be configured as or otherwise support a means for determining, based on the indication, a beam direction associated with the first subset of symbols of the set of symbols associated with the phase discontinuity. In some examples, the resource component 635 may be configured as or otherwise support a means for receiving the wireless communication during the second subset of symbols of the set of symbols based on determining the beam direction associated with the first subset of symbols of the set of symbols associated with the phase discontinuity.

In some examples, the port component 655 may be configured as or otherwise support a means for determining, based on the indication, QCL information associated with the wireless communication. In some examples, the resource component 635 may be configured as or otherwise support a means for receiving the wireless communication during the second subset of symbols of the set of symbols based on determining the QCL information associated with the wireless communication. In some examples, the parameter component 660 may be configured as or otherwise support a means for adjusting a parameter associated with a receiver of the UE based on the indication of the phase discontinuity. In some examples, the resource component 635 may be configured as or otherwise support a means for receiving the wireless communication during the second subset of symbols of the set of symbols based on adjusting the parameter associated with the receiver of the UE. In some examples, the parameter includes a channel estimation algorithm or a frequency offset estimation algorithm.

In some examples, the capability component 665 may be configured as or otherwise support a means for receiving capability information associated with the second device or a third device, the capability information indicating the phase discontinuity. In some examples, the signaling component 630 may be configured as or otherwise support a means for receiving second control signaling indicating a configuration, the configuration indicating one or more conditions corresponding to phase continuity. In some examples, the phase component 670 may be configured as or otherwise support a means for determining the phase discontinuity associated with the wireless communication from the second device based on a phase difference associated with the wireless communication satisfying a threshold. In some examples, the wireless communication corresponds to a density of DMRS s satisfying a density threshold. In some examples, one or more of the first device or the second device include a UE, a repeater device, or a base station, or any combination thereof.

Figure 7:
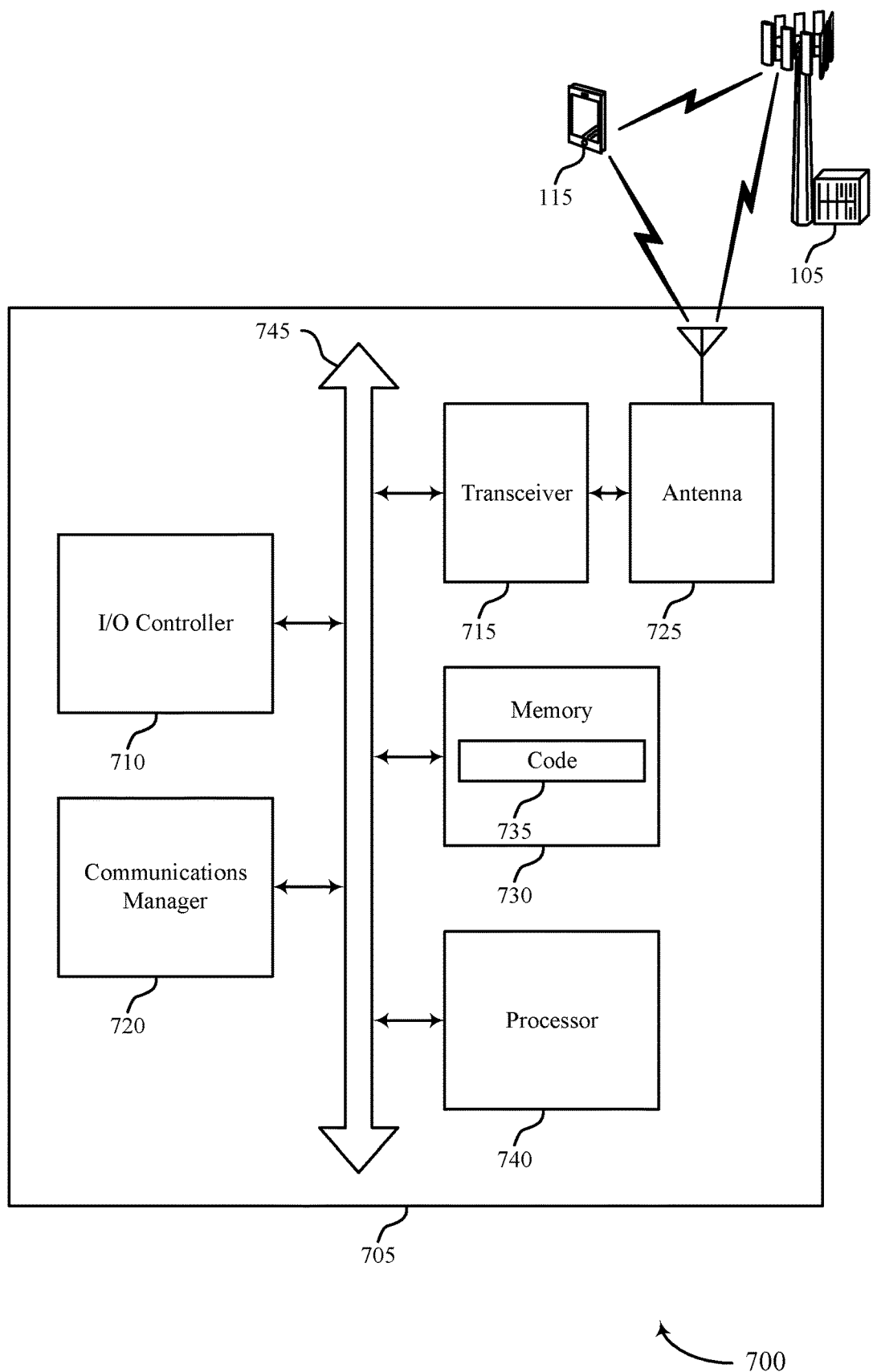
FIG. 7 shows a diagram of a system including a device in accordance with aspects of the present disclosure.

FIG. 7 shows a diagram of a system 700 including a device 705 in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting phase continuity indications). For example, the device 705 or a component of the device 705 may include a processor 740 and memory 730 coupled to the processor 740, the processor 740 and memory 730 configured to perform various functions described herein.

The communications manager 720 may support wireless communication at a first device (e.g., the device 705) in accordance with examples as disclosed herein. For example, the communications manager 720 may be configured as or otherwise support a means for receiving a grant that schedules the wireless communication between the first device and a second device, the grant indicating a DMRS configuration indicating a set of symbols associated with the wireless communication. The communications manager 720 may be configured as or otherwise support a means for receiving control signaling including an indication of a first subset of symbols of the set of symbols associated with a phase discontinuity. The communications manager 720 may be configured as or otherwise support a means for receiving the wireless communication during a second subset of symbols of the set of symbols based on the DMRS configuration and the indication of the first subset of symbols of the set of symbols associated with the phase discontinuity. The communications manager 720 may be configured as or otherwise support a means for estimating a channel based on receiving the wireless communication during the second subset of symbols.

By including or configuring the communications manager 720 in accordance with examples as described herein, the device 705 may support techniques for improved communication reliability based on mitigating potential phase discontinuities at a repeater device. More specifically, the described techniques may enable the device 705 (e.g., a UE 115) to perform channel estimation and frequency offset estimation with improved accuracy and improved reliability, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of providing phase continuity indications as described herein, or the processor 740 and the memory 730 may be otherwise configured to perform or support such operations.

Figure 8:
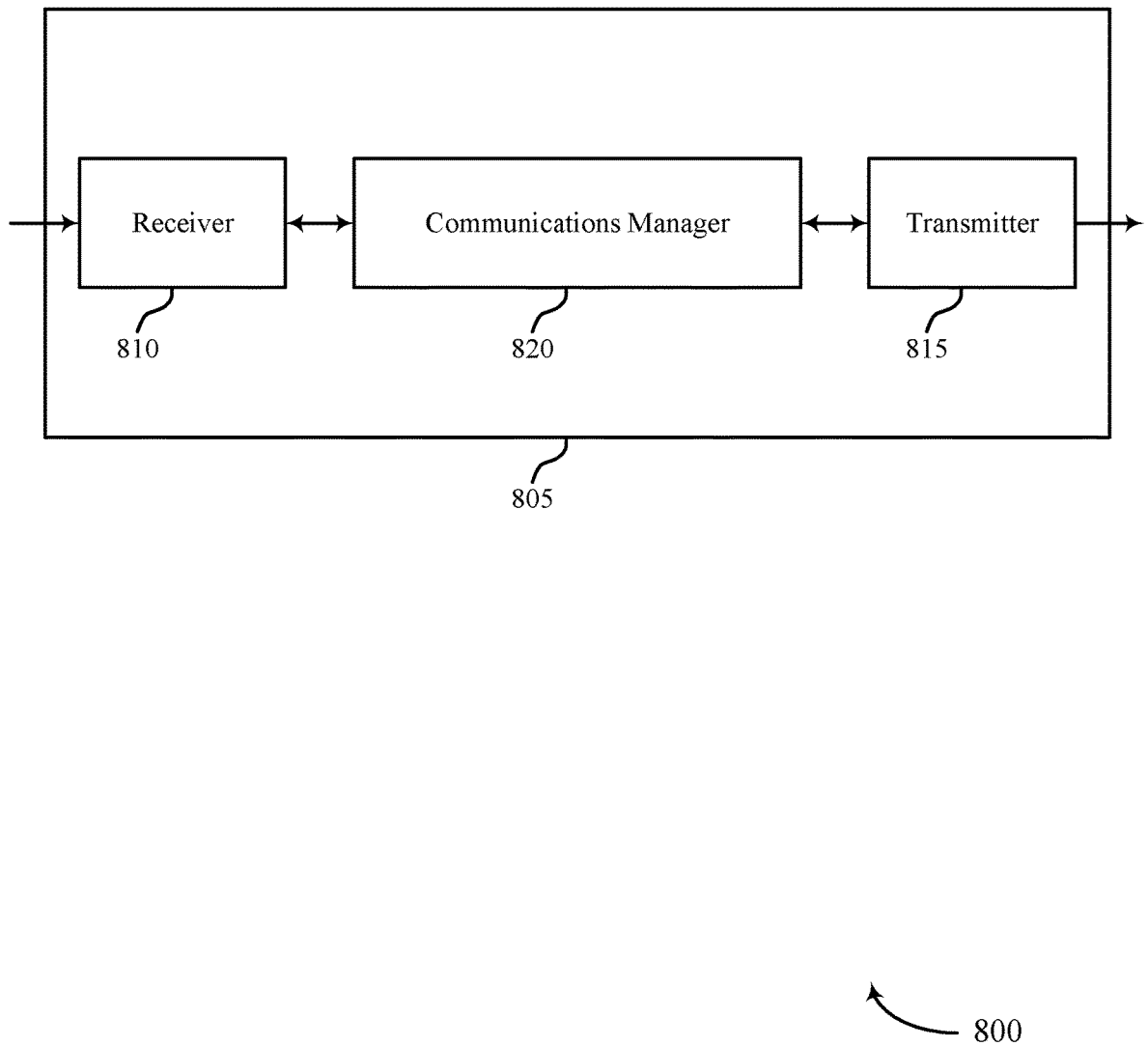
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to providing phase continuity indications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to providing phase continuity indications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of providing phase continuity indications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device (e.g., the device 805) in accordance with examples as disclosed herein. For example, the communications manager 820 may be configured as or otherwise support a means for transmitting a grant that schedules the wireless communication between the first device and a second device, the grant indicating a DMRS configuration indicating a set of symbol durations associated with the wireless communication. The communications manager 820 may be configured as or otherwise support a means for determining a phase discontinuity associated with a first subset of symbol durations of the set of symbol durations. The communications manager 820 may be configured as or otherwise support a means for transmitting control signaling indicating the first subset of symbol durations of the set of symbol durations associated with the phase discontinuity. The communications manager 820 may be configured as or otherwise support a means for transmitting the wireless communication during a second subset of symbol durations of the set of symbol durations based on the DMRS configuration and the phase discontinuity associated with the first subset of symbol durations.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption at the device 805. For example, the described techniques may enable the device 805 (e.g., a base station 105) to perform wireless communications with improved reliability based on mitigating potential phase discontinuities at a repeater device. As a result, the device 805 may request fewer retransmissions, which may reduce power consumption and processing overhead at the device 805.

Figure 9:
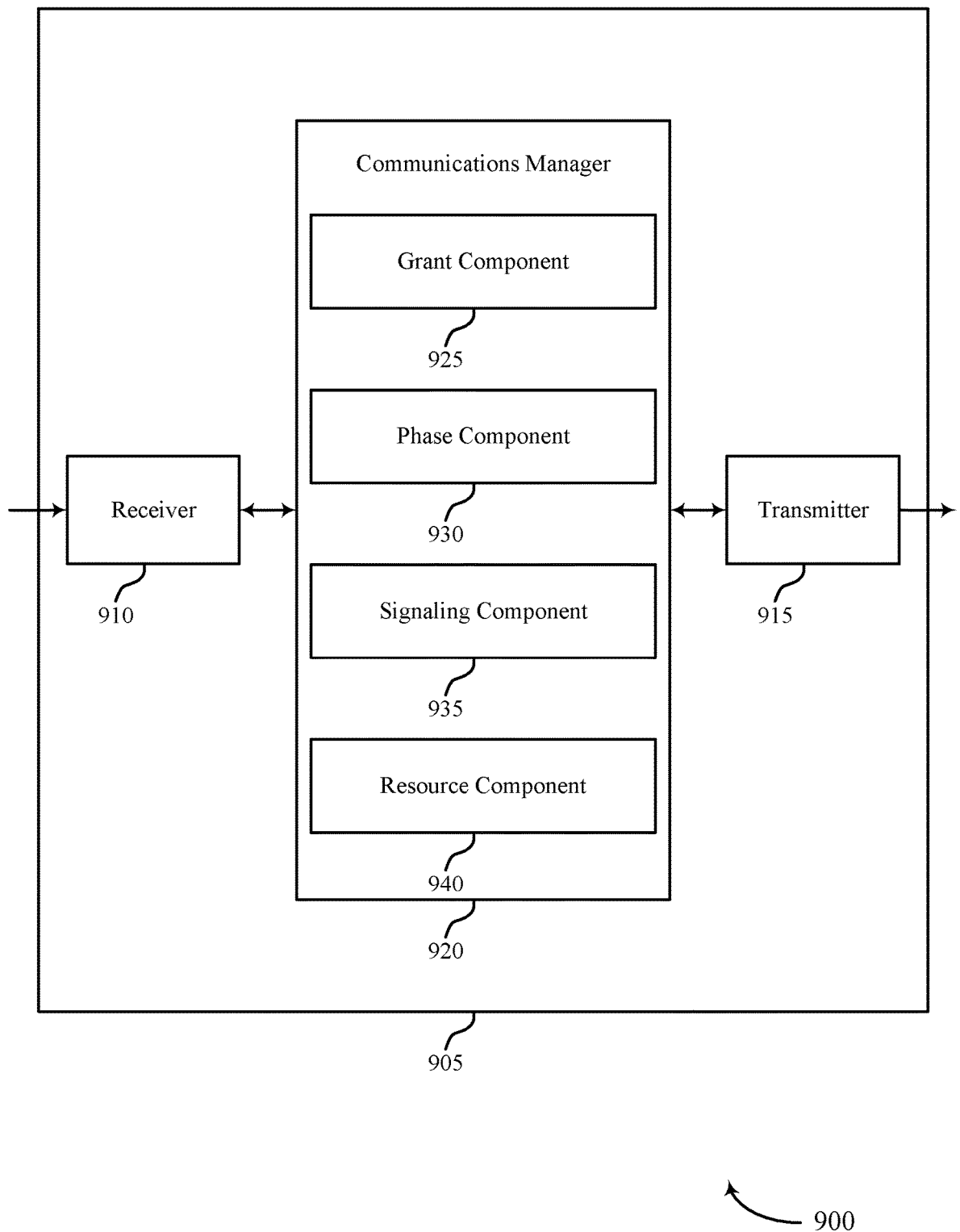

FIG. 9 shows a block diagram 900 of a device 905 in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to providing phase continuity indications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to providing phase continuity indications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of providing phase continuity indications as described herein. For example, the communications manager 920 may include a grant component 925, a phase component 930, a signaling component 935, a resource component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device (e.g., the device 905) in accordance with examples as disclosed herein. The grant component 925 may be configured as or otherwise support a means for transmitting a grant that schedules the wireless communication between the first device and a second device, the grant indicating a DMRS configuration indicating a set of symbol durations associated with the wireless communication. The phase component 930 may be configured as or otherwise support a means for determining a phase discontinuity associated with a first subset of symbol durations of the set of symbol durations. The signaling component 935 may be configured as or otherwise support a means for transmitting control signaling indicating the first subset of symbol durations of the set of symbol durations associated with the phase discontinuity. The resource component 940 may be configured as or otherwise support a means for transmitting the wireless communication during a second subset of symbol durations of the set of symbol durations based on the DMRS configuration and the phase discontinuity associated with the first subset of symbol durations.

Figure 10:
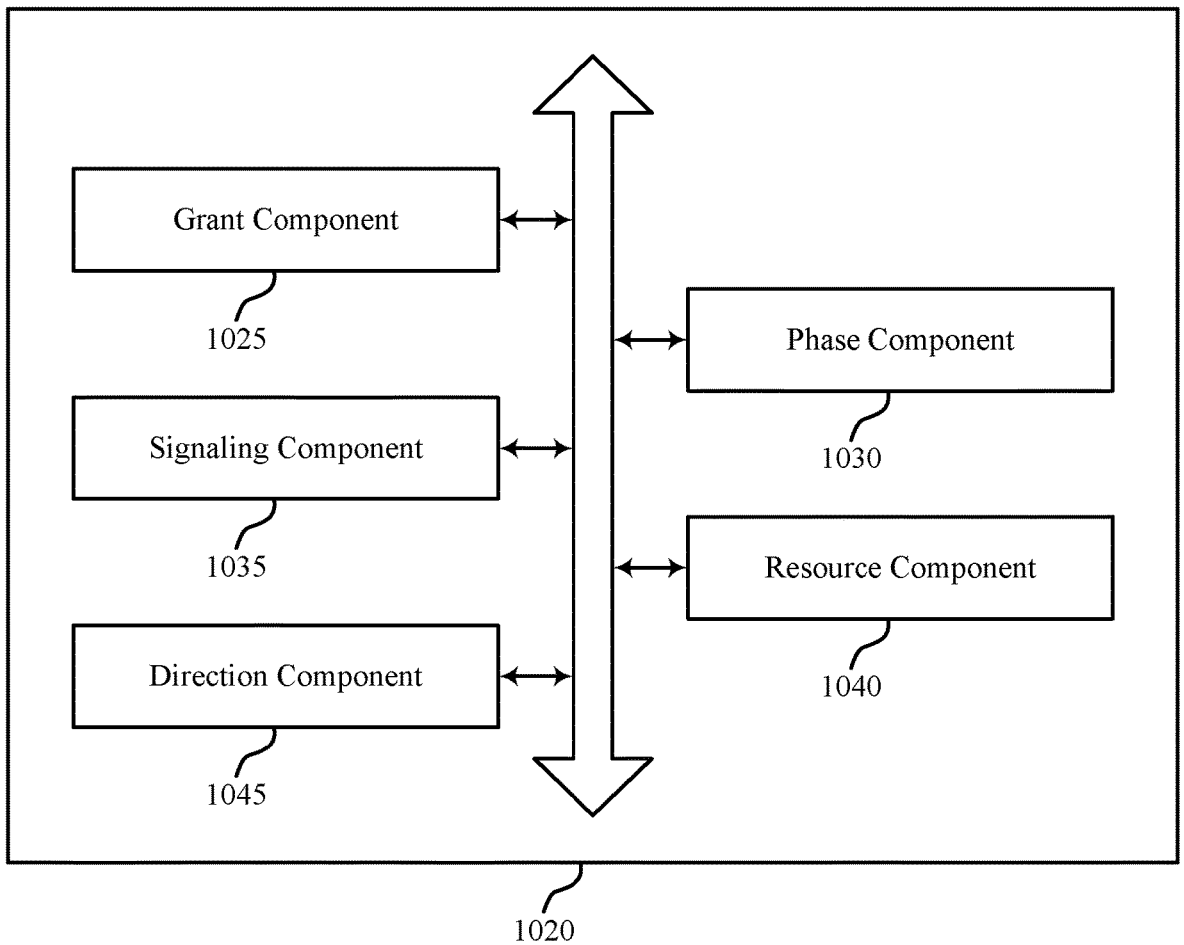
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of providing phase continuity indications as described herein. For example, the communications manager 1020 may include a grant component 1025, a phase component 1030, a signaling component 1035, a resource component 1040, a direction component 1045, or any combination thereof. Each of these components may communicate, directly or indirectly, with one another (e.g., via one or more buses).

The communications manager 1020 may support wireless communication at a first device in accordance with examples as disclosed herein. The grant component 1025 may be configured as or otherwise support a means for transmitting a grant that schedules the wireless communication between the first device and a second device, the grant indicating a DMRS configuration indicating a set of symbol durations associated with the wireless communication. The phase component 1030 may be configured as or otherwise support a means for determining a phase discontinuity associated with a first subset of symbol durations of the set of symbol durations. The signaling component 1035 may be configured as or otherwise support a means for transmitting control signaling indicating the first subset of symbol durations of the set of symbol durations associated with the phase discontinuity. The resource component 1040 may be configured as or otherwise support a means for transmitting the wireless communication during a second subset of symbol durations of the set of symbol durations based on the DMRS configuration and the phase discontinuity associated with the first subset of symbol durations.

In some examples, to support transmitting the control signaling, the signaling component 1035 may be configured as or otherwise support a means for transmitting a semi-static control message including the indication of the first subset of symbols of the set of symbols associated with the phase discontinuity. In some examples, the semi-static control message includes an RRC configuration message. In some examples, to support transmitting the control signaling, the signaling component 1035 may be configured as or otherwise support a means for transmitting a dynamic control message including the indication of the first subset of symbols of the set of symbols associated with the phase discontinuity. In some examples, the dynamic control message includes a DCI or a MAC-CE.

In some examples, the signaling component 1035 may be configured as or otherwise support a means for transmitting the control signaling including the indication of the first subset of symbols of the set of symbols associated with the phase discontinuity based on a periodicity. In some examples, the signaling component 1035 may be configured as or otherwise support a means for transmitting the control signaling including the indication of the first subset of symbols of the set of symbols associated with the phase discontinuity based on a semi-persistent scheduling of the control signaling.

In some examples, the resource component 1040 may be configured as or otherwise support a means for determining one or more of a respective symbol location for each respective symbol of the first subset of symbols of the set of symbols associated with the phase discontinuity or a respective symbol duration for each respective symbol of the first subset of symbols of the set of symbols associated with the phase discontinuity. In some examples, the resource component 1040 may be configured as or otherwise support a means for transmitting the wireless communication during the second subset of symbols of the set of symbols based on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

In some examples, the resource component 1040 may be configured as or otherwise support a means for determining one or more TTIs associated with the first subset of symbols of the set of symbols associated with the phase discontinuity, the one or more TTIs including one or more slots. In some examples, the resource component 1040 may be configured as or otherwise support a means for transmitting the wireless communication during the second subset of symbols of the set of symbols based on determining the one or more TTIs associated with the first subset of symbols of the set of symbols associated with the phase discontinuity.

In some examples, the direction component 1045 may be configured as or otherwise support a means for determining a communication direction associated with the wireless communication, the communication direction corresponding to an uplink direction or a downlink direction. In some examples, the resource component 1040 may be configured as or otherwise support a means for transmitting the wireless communication during the second subset of symbols of the set of symbols based on determining the communication direction associated with the wireless communication.

In some examples, the resource component 1040 may be configured as or otherwise support a means for determining a resource type associated with the first subset of symbols of the set of symbols associated with the phase discontinuity, the resource type indicating a half-duplex type resource or a full-duplex type resource. In some examples, the resource component 1040 may be configured as or otherwise support a means for transmitting the wireless communication during the second subset of symbols of the set of symbols based on determining the resource type. In some examples, one or more of the first device or the second device include a UE, a repeater device, or a base station, or any combination thereof.

Figure 11:
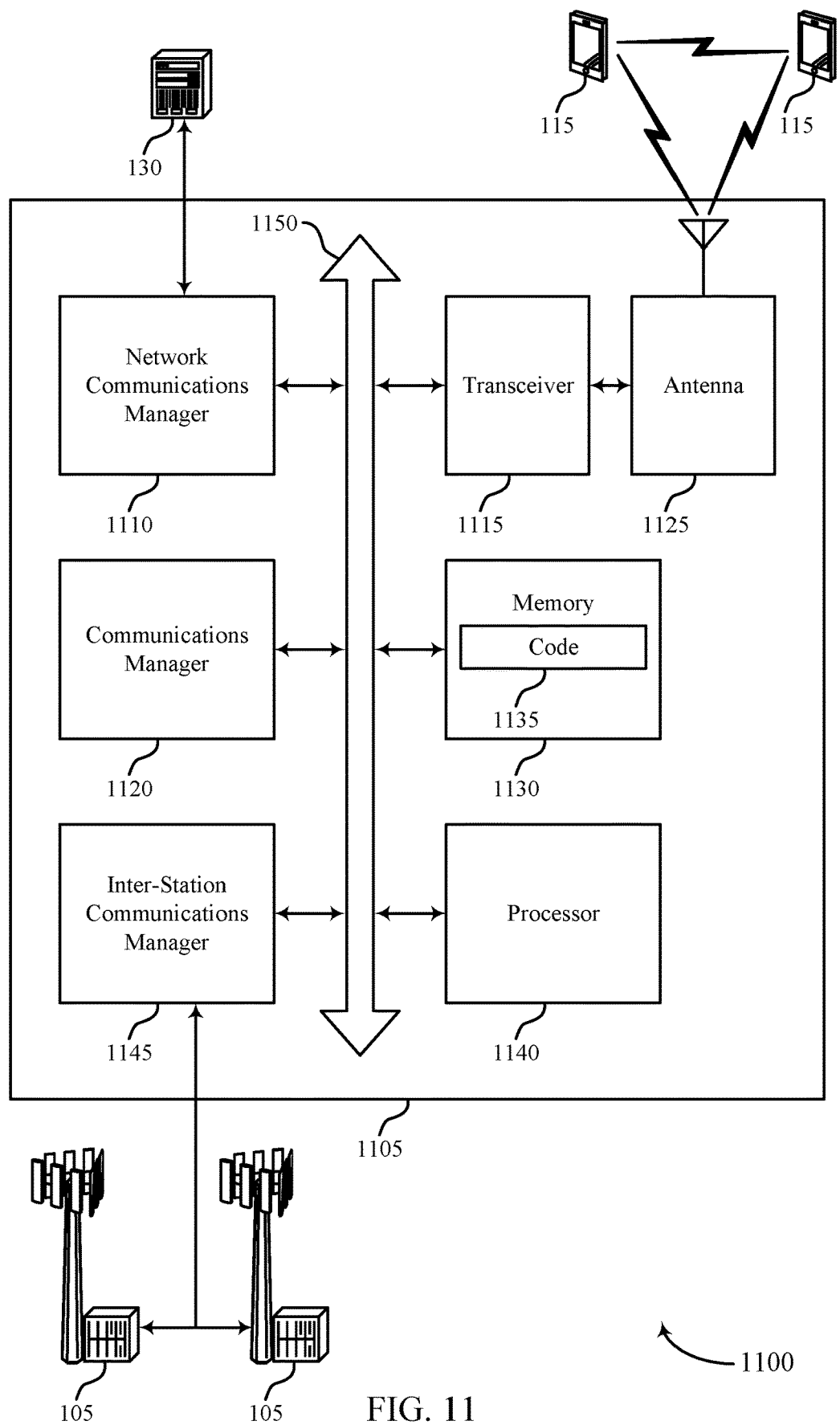
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting phase continuity indications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a first device (e.g., the device 1105) in accordance with examples as disclosed herein. For example, the communications manager 1120 may be configured as or otherwise support a means for transmitting a grant that schedules the wireless communication between the first device and a second device, the grant indicating a DMRS configuration indicating a set of symbol durations associated with the wireless communication. The communications manager 1120 may be configured as or otherwise support a means for determining a phase discontinuity associated with a first subset of symbol durations of the set of symbol durations. The communications manager 1120 may be configured as or otherwise support a means for transmitting control signaling indicating the first subset of symbol durations of the set of symbol durations associated with the phase discontinuity. The communications manager 1120 may be configured as or otherwise support a means for transmitting the wireless communication during a second subset of symbol durations of the set of symbol durations based on the DMRS configuration and the phase discontinuity associated with the first subset of symbol durations.

By including or configuring the communications manager 1120 in accordance with examples as described herein, the device 1105 may support techniques for improved communication reliability based on mitigating potential phase discontinuities at a repeater device. As a result, the device 1105 may perform channel estimation and frequency offset estimation with improved accuracy, which may increase the likelihood of successful communications at the device 1105.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of providing phase continuity indications as described herein, or the processor 1140 and the memory 1130 may be otherwise configured to perform or support such operations.

Figure 12:
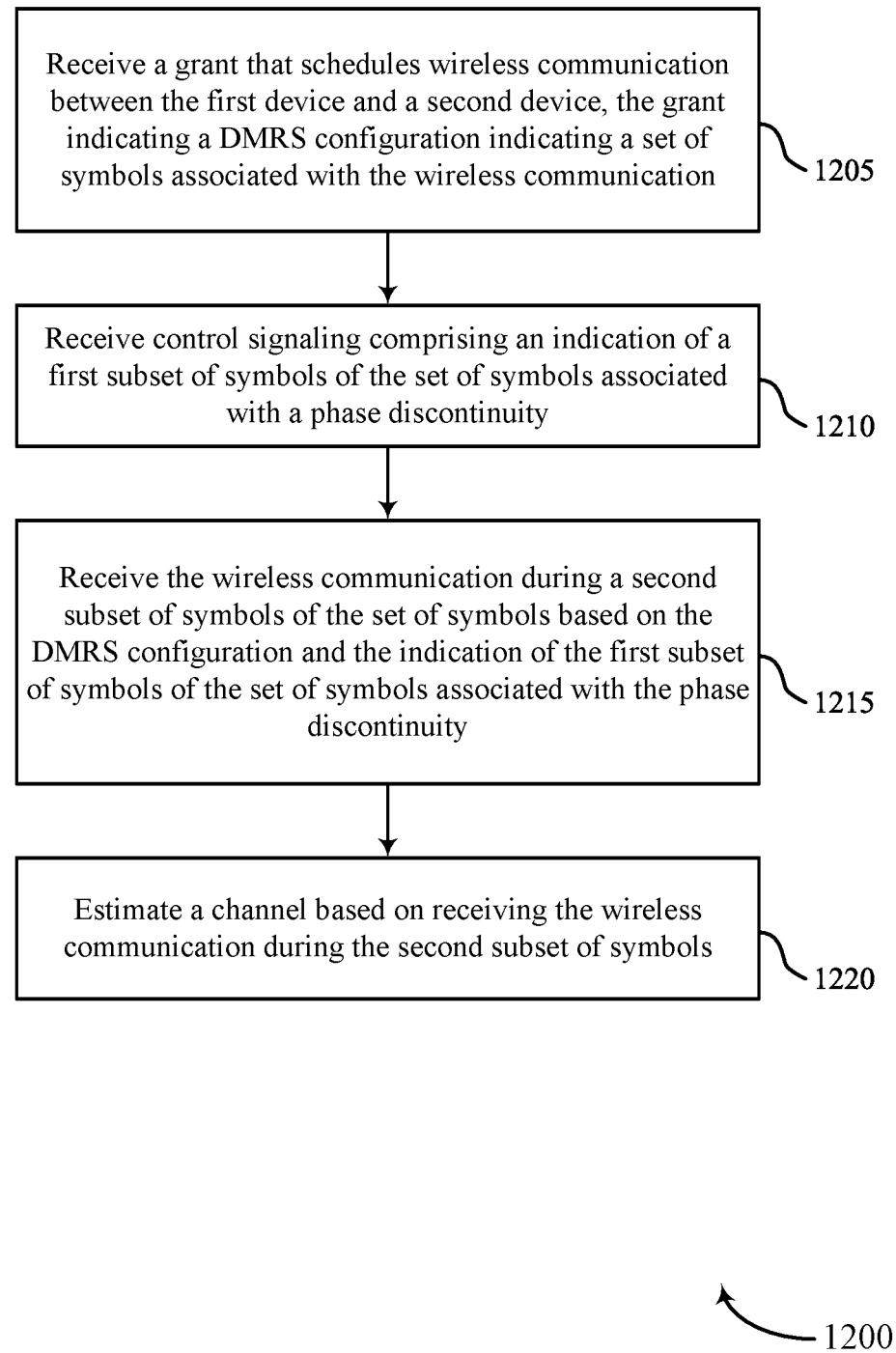
FIGS. 12 through 17 show flowcharts illustrating methods in accordance with aspects of the present disclosure.

FIG. 12 shows a flowchart illustrating a method 1200 in accordance with aspects of the present disclosure. The operations of the method 1200 may be implemented by a first device (e.g., a UE 115) or its components as described herein. For example, the operations of the method 1200 may be performed by a first device (e.g., a UE 115) as described with reference to FIGS. 1 through 7. In some examples, a first device (e.g., a UE 115) may execute a set of instructions to control the functional elements of the first device (e.g., the UE 115) to perform the described functions. Additionally or alternatively, a first device (e.g., a UE 115) may perform aspects of the described functions using special-purpose hardware.

At 1205, the method may include receiving a grant that schedules wireless communication between the first device and a second device, the grant indicating a DMRS configuration indicating a set of symbols associated with the wireless communication. The operations of 1205 may be performed in accordance with examples as disclosed herein. In some examples, aspects of the operations of 1205 may be performed by a grant component 625 as described with reference to FIG. 6.

At 1210, the method may include receiving control signaling including an indication of a first subset of symbols of the set of symbols associated with a phase discontinuity. The operations of 1210 may be performed in accordance with examples as disclosed herein. In some examples, aspects of the operations of 1210 may be performed by a signaling component 630 as described with reference to FIG. 6.

At 1215, the method may include receiving the wireless communication during a second subset of symbols of the set of symbols based on the DMRS configuration and the indication of the first subset of symbols of the set of symbols associated with the phase discontinuity. The operations of 1215 may be performed in accordance with examples as disclosed herein. In some examples, aspects of the operations of 1215 may be performed by a resource component 635 as described with reference to FIG. 6.

At 1220, the method may include estimating a channel based on receiving the wireless communication during the second subset of symbols. The operations of 1220 may be performed in accordance with examples as disclosed herein. In some examples, aspects of the operations of 1220 may be performed by a channel component 640 as described with reference to FIG. 6.

Figure 13:
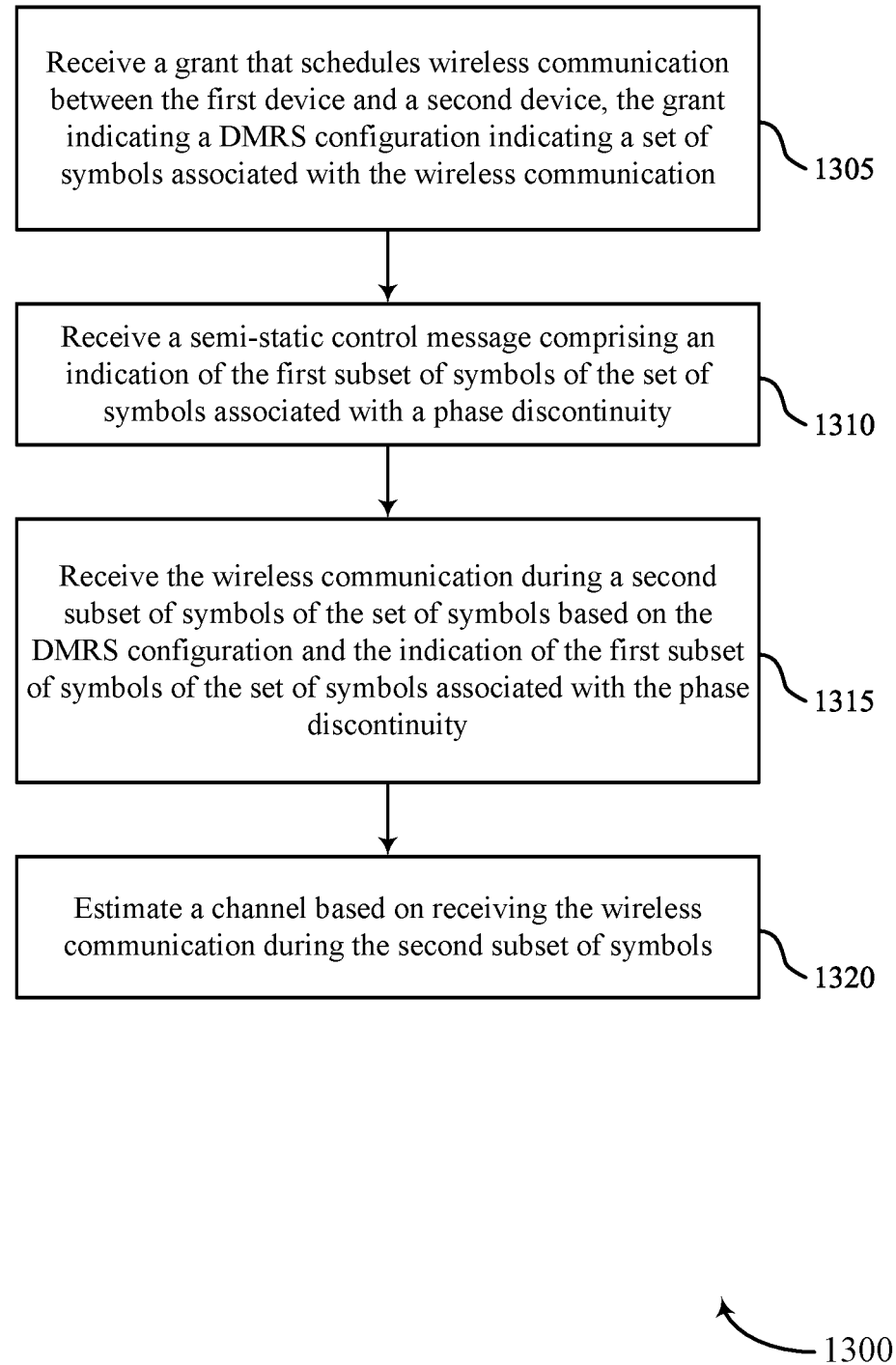

FIG. 13 shows a flowchart illustrating a method 1300 in accordance with aspects of the present disclosure. The operations of the method 1300 may be implemented by a first device (e.g., a UE 115) or its components as described herein. For example, the operations of the method 1300 may be performed by a first device (e.g., a UE 115) as described with reference to FIGS. 1 through 7. In some examples, a first device (e.g., a UE 115) may execute a set of instructions to control the functional elements of the first device (e.g., the UE 115) to perform the described functions. Additionally or alternatively, a first device (e.g., the UE 115) may perform aspects of the described functions using special-purpose hardware.

At 1305, the method may include receiving a grant that schedules wireless communication between the first device and a second device, the grant indicating a DMRS configuration indicating a set of symbols associated with the wireless communication. The operations of 1305 may be performed in accordance with examples as disclosed herein. In some examples, aspects of the operations of 1305 may be performed by a grant component 625 as described with reference to FIG. 6.

At 1310, the method may include receiving a semi-static control message including an indication of the first subset of symbols of the set of symbols associated with a phase discontinuity. The operations of 1310 may be performed in accordance with examples as disclosed herein. In some examples, aspects of the operations of 1310 may be performed by a signaling component 630 as described with reference to FIG. 6.

At 1315, the method may include receiving the wireless communication during a second subset of symbols of the set of symbols based on the DMRS configuration and the indication of the first subset of symbols of the set of symbols associated with the phase discontinuity. The operations of 1315 may be performed in accordance with examples as disclosed herein. In some examples, aspects of the operations of 1315 may be performed by a resource component 635 as described with reference to FIG. 6.

At 1320, the method may include estimating a channel based on receiving the wireless communication during the second subset of symbols. The operations of 1320 may be performed in accordance with examples as disclosed herein. In some examples, aspects of the operations of 1320 may be performed by a channel component 640 as described with reference to FIG. 6.

Figure 14:
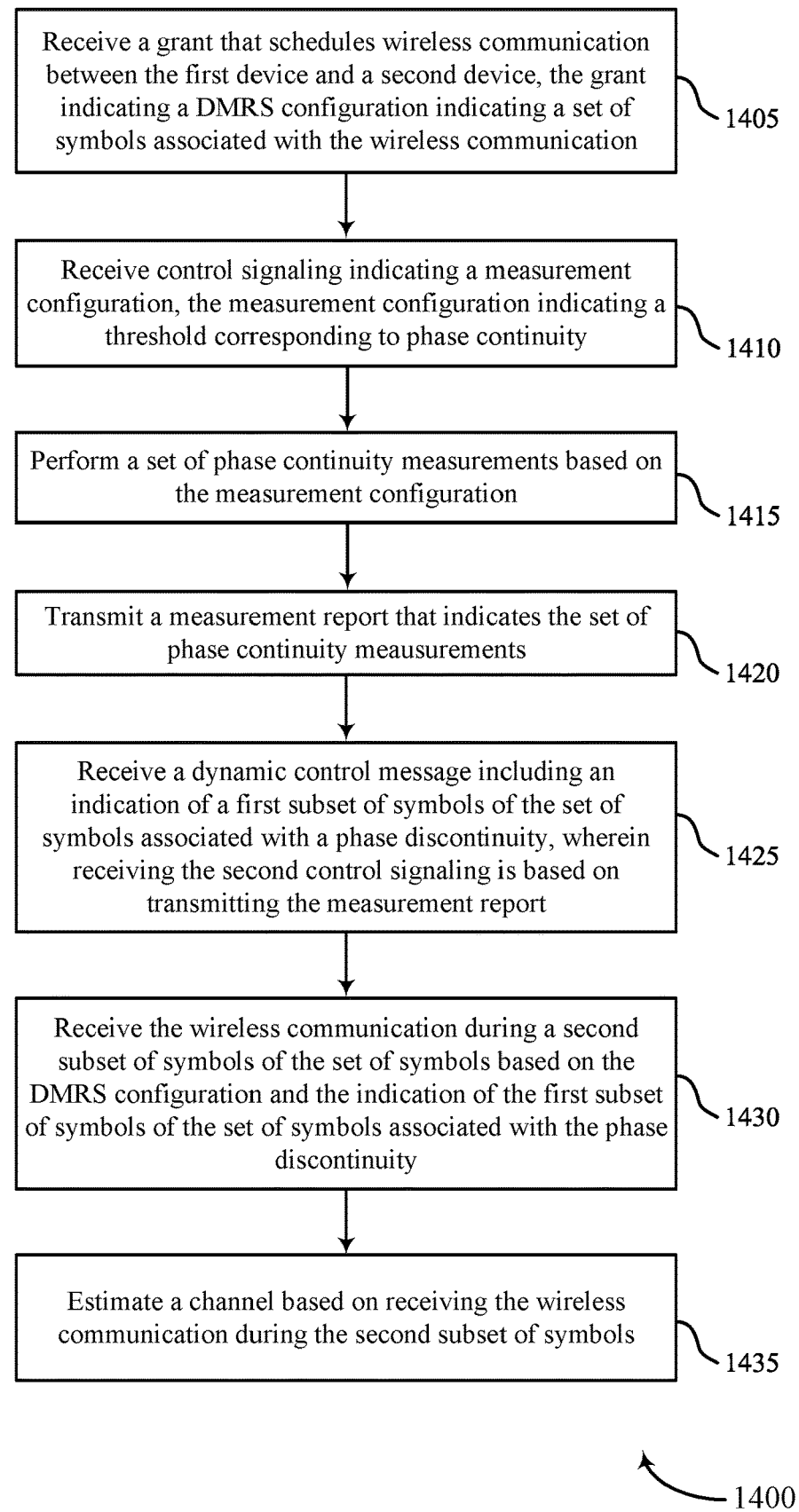

FIG. 14 shows a flowchart illustrating a method 1400 in accordance with aspects of the present disclosure. The operations of the method 1400 may be implemented by a first device (e.g., a UE 115) or its components as described herein. For example, the operations of the method 1400 may be performed by a UE 115 as described with reference to FIGS. 1 through 7. In some examples, a first device (e.g., a UE 115) may execute a set of instructions to control the functional elements of the first device (e.g., the UE 115) to perform the described functions. Additionally or alternatively, a first device (e.g., a UE 115) may perform aspects of the described functions using special-purpose hardware.

At 1405, the method may include receiving a grant that schedules wireless communication between the first device and a second device, the grant indicating a DMRS configuration indicating a set of symbols associated with the wireless communication. The operations of 1405 may be performed in accordance with examples as disclosed herein. In some examples, aspects of the operations of 1405 may be performed by a grant component 625 as described with reference to FIG. 6.

At 1410, the method may include receiving control signaling indicating a measurement configuration, the measurement configuration indicating a threshold corresponding to a phase continuity. The operations of 1410 may be performed in accordance with examples as disclosed herein. In some examples, aspects of the operations of 1410 may be performed by a signaling component 630 as described with reference to FIG. 6.

At 1415, the method may include performing a set of phase continuity measurements based on the measurement configuration. The operations of 1415 may be performed in accordance with examples as disclosed herein. In some examples, aspects of the operations of 1415 may be performed by a phase component 670 as described with reference to FIG. 6.

At 1420, the method may include transmitting a measurement report that indicates the set of phase continuity measurements. The operations of 1420 may be performed in accordance with examples as disclosed herein. In some examples, aspects of the operations of 1420 may be performed by a signaling component 630 as described with reference to FIG. 6.

At 1425, the method may include receiving a dynamic control message including an indication of the first subset of symbols of the set of symbols associated with a phase discontinuity. The operations of 1425 may be performed in accordance with examples as disclosed herein. In some examples, aspects of the operations of 1425 may be performed by a signaling component 630 as described with reference to FIG. 6.

At 1430, the method may include receiving the wireless communication during a second subset of symbols of the set of symbols based on the DMRS configuration and the indication of the first subset of symbols of the set of symbols associated with the phase discontinuity. The operations of 1430 may be performed in accordance with examples as disclosed herein. In some examples, aspects of the operations of 30 may be performed by a resource component 635 as described with reference to FIG. 6.

At 1435, the method may include estimating a channel based on receiving the wireless communication during the second subset of symbols. The operations of 1435 may be performed in accordance with examples as disclosed herein. In some examples, aspects of the operations of 1435 may be performed by a channel component 640 as described with reference to FIG. 6.

Figure 15:
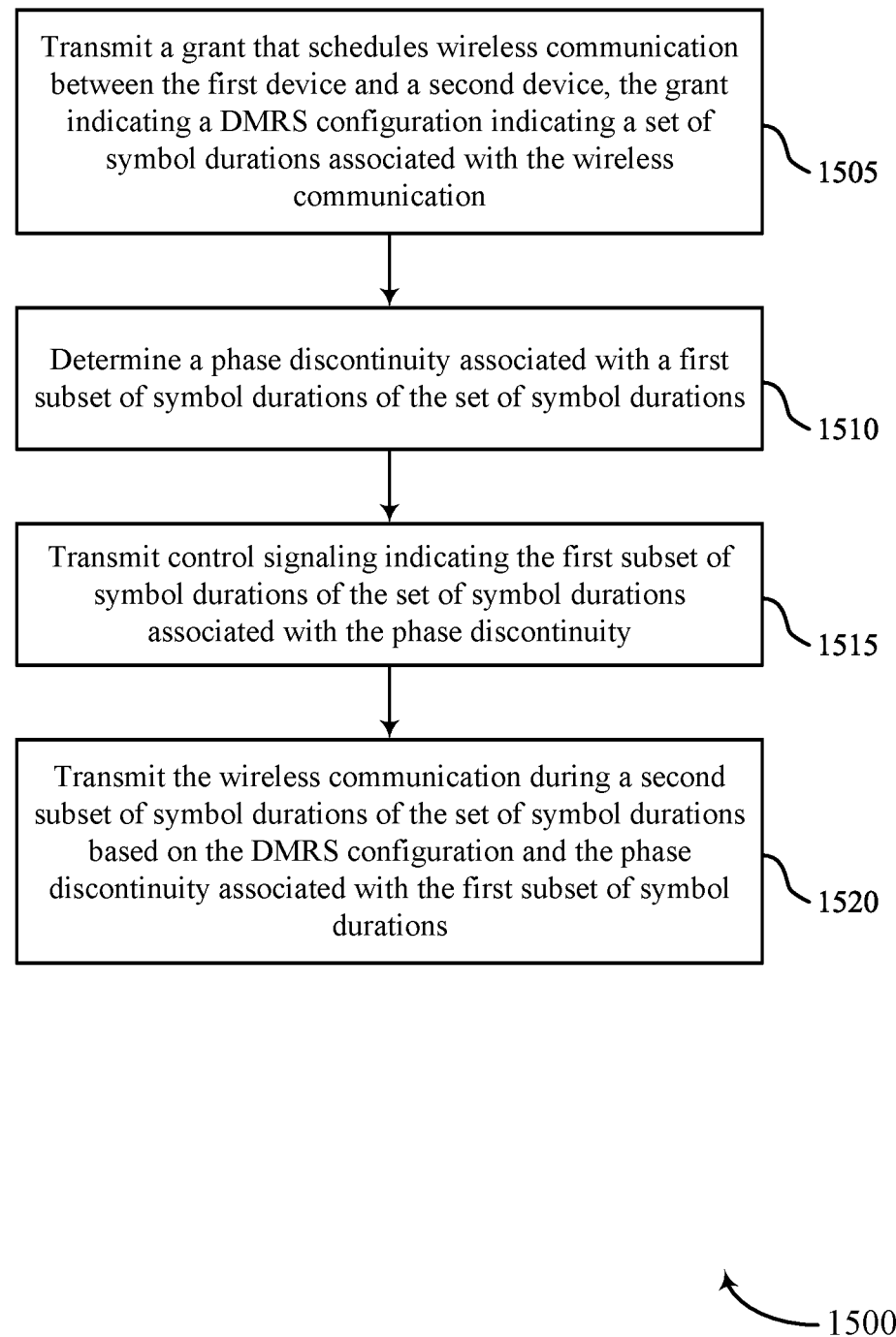

FIG. 15 shows a flowchart illustrating a method 1500 in accordance with aspects of the present disclosure. The operations of the method 1500 may be implemented by a first device (e.g., a base station 105) or its components as described herein. For example, the operations of the method 1500 may be performed by a first device (e.g., a base station 105) as described with reference to FIGS. 1 through 3 and 8 through 11. In some examples, a first device (e.g., a base station 105) may execute a set of instructions to control the functional elements of the first device (e.g., the base station 105) to perform the described functions. Additionally or alternatively, a first device (e.g., a base station 105) may perform aspects of the described functions using special-purpose hardware.

At 1505, the method may include transmitting a grant that schedules the wireless communication between the first device and a second device, the grant indicating a DMRS configuration indicating a set of symbol durations associated with the wireless communication. The operations of 1505 may be performed in accordance with examples as disclosed herein. In some examples, aspects of the operations of 1505 may be performed by a grant component 1025 as described with reference to FIG. 10.

At 1510, the method may include determining a phase discontinuity associated with a first subset of symbol durations of the set of symbol durations. The operations of 1510 may be performed in accordance with examples as disclosed herein. In some examples, aspects of the operations of 1510 may be performed by a phase component 1030 as described with reference to FIG. 10.

At 1515, the method may include transmitting control signaling indicating the first subset of symbol durations of the set of symbol durations associated with the phase discontinuity. The operations of 1515 may be performed in accordance with examples as disclosed herein. In some examples, aspects of the operations of 1515 may be performed by a signaling component 1035 as described with reference to FIG. 10.

At 1520, the method may include transmitting the wireless communication during a second subset of symbol durations of the set of symbol durations based on the DMRS configuration and the phase discontinuity associated with the first subset of symbol durations. The operations of 1520 may be performed in accordance with examples as disclosed herein. In some examples, aspects of the operations of 1520 may be performed by a resource component 1040 as described with reference to FIG. 10.

Figure 16:
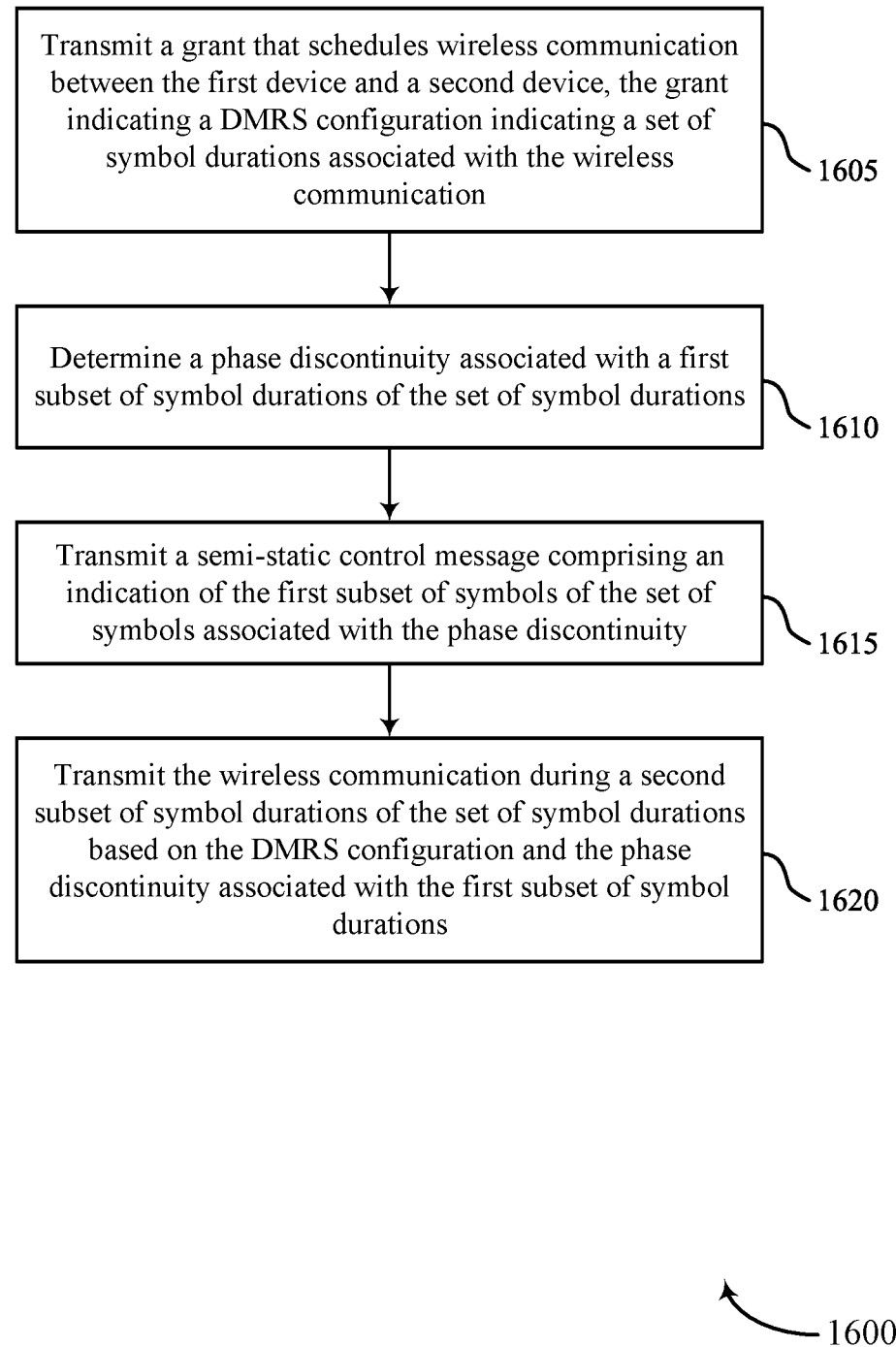

FIG. 16 shows a flowchart illustrating a method 1600 in accordance with aspects of the present disclosure. The operations of the method 1600 may be implemented by first device (e.g., a base station 105) or its components as described herein. For example, the operations of the method 1600 may be performed by a first device (e.g., a base station 105) as described with reference to FIGS. 1 through 3 and 8 through 11. In some examples, a first device (e.g., a base station 105) may execute a set of instructions to control the functional elements of the first device (e.g., the base station 105) to perform the described functions. Additionally or alternatively, a first device (e.g., a base station 105) may perform aspects of the described functions using special-purpose hardware.

At 1605, the method may include transmitting a grant that schedules wireless communication between the first device and a second device, the grant indicating a DMRS configuration indicating a set of symbol durations associated with the wireless communication. The operations of 1605 may be performed in accordance with examples as disclosed herein. In some examples, aspects of the operations of 1605 may be performed by a grant component 1025 as described with reference to FIG. 10.

At 1610, the method may include determining a phase discontinuity associated with a first subset of symbol durations of the set of symbol durations. The operations of 1610 may be performed in accordance with examples as disclosed herein. In some examples, aspects of the operations of 1610 may be performed by a phase component 1030 as described with reference to FIG. 10.

At 1615, the method may include transmitting a semi-static control message including an indication of the first subset of symbols of the set of symbols associated with the phase discontinuity. The operations of 1615 may be performed in accordance with examples as disclosed herein. In some examples, aspects of the operations of 1615 may be performed by a signaling component 1035 as described with reference to FIG. 10.

At 1620, the method may include transmitting the wireless communication during a second subset of symbol durations of the set of symbol durations based on the DMRS configuration and the phase discontinuity associated with the first subset of symbol durations. The operations of 1620 may be performed in accordance with examples as disclosed herein. In some examples, aspects of the operations of 1620 may be performed by a resource component 1040 as described with reference to FIG. 10.

Figure 17:
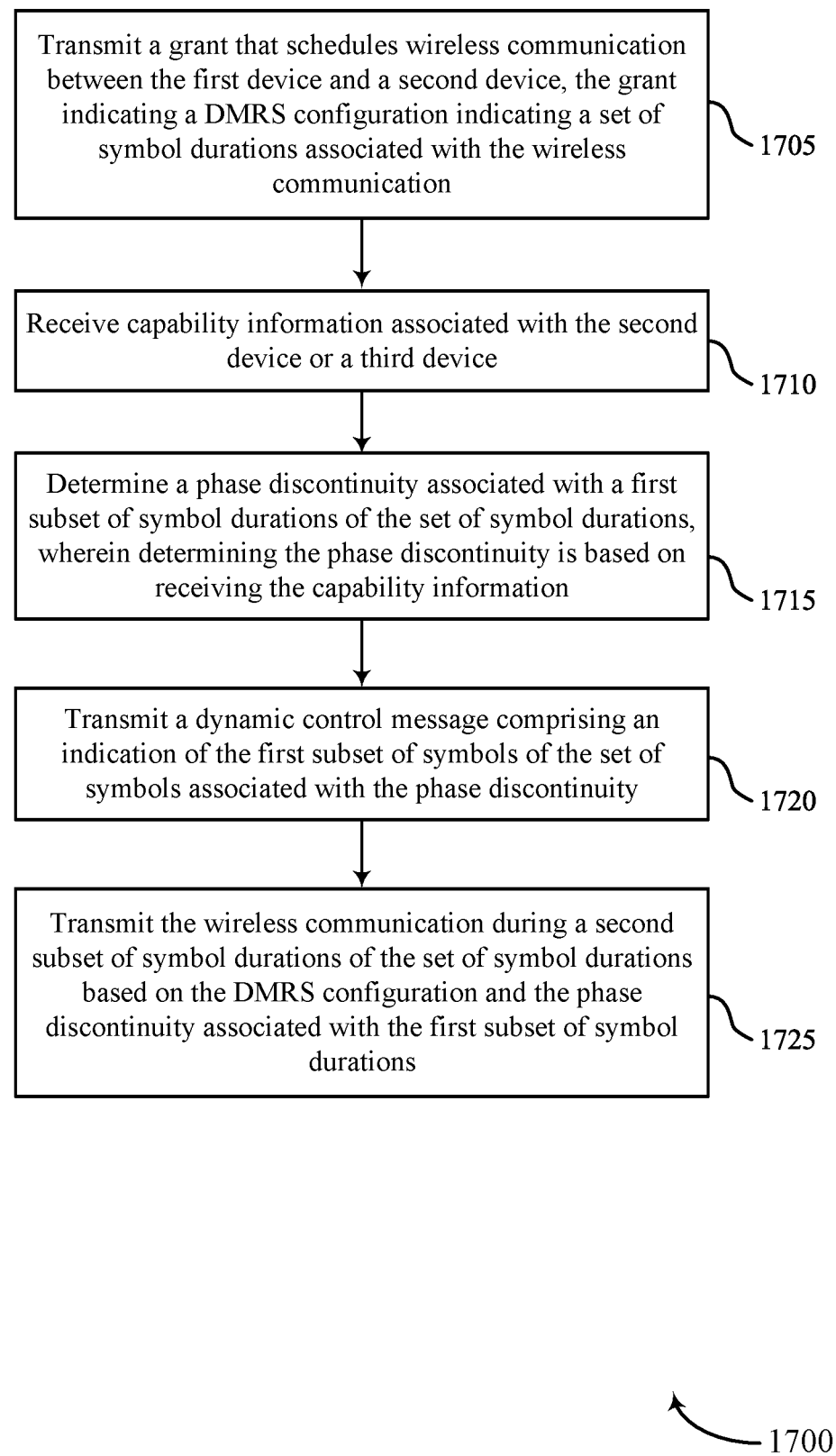

FIG. 17 shows a flowchart illustrating a method 1700 in accordance with aspects of the present disclosure. The operations of the method 1700 may be implemented by a first device (e.g., a base station 105) or its components as described herein. For example, the operations of the method 1700 may be performed by a first device (e.g., a base station 105) as described with reference to FIGS. 1 through 3 and 8 through 11. In some examples, a first device (e.g., a base station 105) may execute a set of instructions to control the functional elements of the first device (e.g., the base station 105) to perform the described functions. Additionally or alternatively, the first device may perform aspects of the described functions using special-purpose hardware.

At 1705, the method may include transmitting a grant that schedules wireless communication between the first device and a second device, the grant indicating a DMRS configuration indicating a set of symbol durations associated with the wireless communication. The operations of 1705 may be performed in accordance with examples as disclosed herein. In some examples, aspects of the operations of 1705 may be performed by a grant component 1025 as described with reference to FIG. 10.

At 1710, the method may include receiving capability information associated with the second device or a third device. The operations of 1710 may be performed in accordance with examples as disclosed herein. In some examples, aspects of the operations of 1710 may be performed by a signaling component 1035 as described with reference to FIG. 10.

At 1715, the method may include determining a phase discontinuity associated with a first subset of symbol durations of the set of symbol durations, where determining the phase discontinuity is based on receiving the capability information. The operations of 1715 may be performed in accordance with examples as disclosed herein. In some examples, aspects of the operations of 1715 may be performed by a phase component 1030 as described with reference to FIG. 10.

At 1720, the method may include transmitting a dynamic control message including an indication of the first subset of symbols of the set of symbols associated with the phase discontinuity. The operations of 1720 may be performed in accordance with examples as disclosed herein. In some examples, aspects of the operations of 1720 may be performed by a signaling component 1035 as described with reference to FIG. 10.

At 1725, the method may include transmitting the wireless communication during a second subset of symbol durations of the set of symbol durations based on the DMRS configuration and the phase discontinuity associated with the first subset of symbol durations. The operations of 1725 may be performed in accordance with examples as disclosed herein. In some examples, aspects of the operations of 1725 may be performed by a resource component 1040 as described with reference to FIG. 10.

The following provides an overview of aspects of the present disclosure:

Aspect 1: A method for wireless communication at a first device, comprising: receiving a grant that schedules the wireless communication between the first device and a second device, the grant indicating a DMRS configuration indicating a set of symbols associated with the wireless communication; receiving control signaling comprising an indication of a first subset of symbols of the set of symbols associated with a phase discontinuity; receiving the wireless communication during a second subset of symbols of the set of symbols based at least in part on the DMRS configuration and the indication of the first subset of symbols of the set of symbols associated with the phase discontinuity; and estimating a channel based at least in part on receiving the wireless communication during the second subset of symbols.

Aspect 2: The method of aspect 1, wherein receiving the control signaling comprises: receiving a semi-static control message comprising the indication of the first subset of symbols of the set of symbols associated with the phase discontinuity, wherein the semi-static control message comprises an RRC configuration message.

Aspect 3: The method of any of aspects 1 through 2, wherein receiving the control signaling comprises: receiving a dynamic control message comprising the indication of the first subset of symbols of the set of symbols associated with the phase discontinuity, wherein the dynamic control message comprises a DCI or a MAC-CE.

Aspect 4: The method of any of aspects 1 through 3, further comprising: receiving the control signaling comprising the indication of the first subset of symbols of the set of symbols associated with the phase discontinuity based at least in part on a periodicity.

Aspect 5: The method of any of aspects 1 through 4, further comprising: receiving the control signaling comprising the indication of the first subset of symbols of the set of symbols associated with the phase discontinuity based at least in part on a semi-persistent scheduling of the control signaling.

Aspect 6: The method of any of aspects 1 through 5, further comprising: determining, based at least in part on the indication, one or more of a respective symbol location for each respective symbol of the first subset of symbols of the set of symbols associated with the phase discontinuity or a respective symbol duration for each respective symbol of the first subset of symbols of the set of symbols associated with the phase discontinuity, wherein receiving the wireless communication during the second subset of symbols of the set of symbols is based at least in part on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

Aspect 7: The method of any of aspects 1 through 6, further comprising: determining, based at least in part on the indication, one or more TTIs associated with the first subset of symbols of the set of symbols associated with the phase discontinuity, the one or more TTIs comprising one or more slots, wherein receiving the wireless communication during the second subset of symbols of the set of symbols is based at least in part on determining the one or more TTIs associated with the first subset of symbols of the set of symbols associated with the phase discontinuity.

Aspect 8: The method of any of aspects 1 through 7, further comprising: determining, based at least in part on the indication, a communication direction associated with the wireless communication, the communication direction corresponding to an uplink direction or a downlink direction, wherein receiving the wireless communication during the second subset of symbols of the set of symbols is based at least in part on determining the communication direction associated with the wireless communication.

Aspect 9: The method of any of aspects 1 through 8, further comprising: determining, based at least in part on the indication, a resource type associated with the first subset of symbols of the set of symbols associated with the phase discontinuity, the resource type indicating a half-duplex type resource or a full-duplex type resource, wherein receiving the wireless communication during the second subset of symbols of the set of symbols is based at least in part on determining the resource type.

Aspect 10: The method of any of aspects 1 through 9, further comprising: determining, based at least in part on the indication, a beam direction associated with the first subset of symbols of the set of symbols associated with the phase discontinuity, wherein receiving the wireless communication during the second subset of symbols of the set of symbols is based at least in part on determining the beam direction associated with the first subset of symbols of the set of symbols associated with the phase discontinuity.

Aspect 11: The method of any of aspects 1 through 10, further comprising: determining, based at least in part on the indication, QCL information associated with the wireless communication, wherein receiving the wireless communication during the second subset of symbols of the set of symbols is based at least in part on determining the QCL information associated with the wireless communication.

Aspect 12: The method of any of aspects 1 through 11, further comprising: adjusting a parameter associated with a receiver of the UE based at least in part on the indication of the phase discontinuity, wherein receiving the wireless communication during the second subset of symbols of the set of symbols is based at least in part on adjusting the parameter associated with the receiver of the UE.

Aspect 13: The method of aspect 12, wherein the parameter comprises a channel estimation algorithm or a frequency offset estimation algorithm.

Aspect 14: The method of any of aspects 1 through 13, further comprising: receiving capability information associated with the second device or a third device, the capability information indicating the phase discontinuity.

Aspect 15: The method of any of aspects 1 through 14, further comprising: receiving second control signaling indicating a measurement configuration, the measurement configuration indicating a threshold corresponding to phase continuity; performing a set of phase continuity measurements based at least in part on the measurement configuration; and transmitting a measurement report that indicates the set of phase continuity measurements, wherein receiving the control signaling is based at least in part on transmitting the measurement report.

Aspect 16: The method of any of aspects 1 through 15, further comprising: determining the phase discontinuity associated with the wireless communication from the second device based at least in part on a phase difference associated with the wireless communication satisfying a threshold.

Aspect 17: The method of any of aspects 1 through 16, wherein the wireless communication corresponds to a density of DMRSs satisfying a density threshold.

Aspect 18: The method of any of aspects 1 through 17, wherein one or more of the first device or the second device comprise a UE, a repeater device, or a base station, or any combination thereof.

Aspect 19: A method for wireless communication at a first device, comprising: transmitting a grant that schedules the wireless communication between the first device and a second device, the grant indicating a DMRS configuration indicating a set of symbol durations associated with the wireless communication; determining a phase discontinuity associated with a first subset of symbol durations of the set of symbol durations; transmitting control signaling indicating the first subset of symbol durations of the set of symbol durations associated with the phase discontinuity; and transmitting the wireless communication during a second subset of symbol durations of the set of symbol durations based at least in part on the DMRS configuration and the phase discontinuity associated with the first subset of symbol durations.

Aspect 20: The method of aspect 19, wherein transmitting the control signaling comprises: transmitting a semi-static control message comprising the indication of the first subset of symbols of the set of symbols associated with the phase discontinuity, wherein the semi-static control message comprises an RRC configuration message.

Aspect 21: The method of any of aspects 19 through 20, wherein transmitting the control signaling comprises: transmitting a dynamic control message comprising the indication of the first subset of symbols of the set of symbols associated with the phase discontinuity, wherein the dynamic control message comprises a DCI or a MAC-CE.

Aspect 22: The method of any of aspects 19 through 21, further comprising: transmitting the control signaling comprising the indication of the first subset of symbols of the set of symbols associated with the phase discontinuity based at least in part on a periodicity.

Aspect 23: The method of any of aspects 19 through 22, further comprising: transmitting the control signaling comprising the indication of the first subset of symbols of the set of symbols associated with the phase discontinuity based at least in part on a semi-persistent scheduling of the control signaling.

Aspect 24: The method of any of aspects 19 through 23, further comprising: determining one or more of a respective symbol location for each respective symbol of the first subset of symbols of the set of symbols associated with the phase discontinuity or a respective symbol duration for each respective symbol of the first subset of symbols of the set of symbols associated with the phase discontinuity, wherein transmitting the wireless communication during the second subset of symbols of the set of symbols is based at least in part on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

Aspect 25: The method of any of aspects 19 through 24, further comprising: determining one or more TTIs associated with the first subset of symbols of the set of symbols associated with the phase discontinuity, the one or more TTIs comprising one or more slots, wherein transmitting the wireless communication during the second subset of symbols of the set of symbols is based at least in part on determining the one or more TTIs associated with the first subset of symbols of the set of symbols associated with the phase discontinuity.

Aspect 26: The method of any of aspects 19 through 25, further comprising: determining a communication direction associated with the wireless communication, the communication direction corresponding to an uplink direction or a downlink direction, wherein transmitting the wireless communication during the second subset of symbols of the set of symbols is based at least in part on determining the communication direction associated with the wireless communication.

Aspect 27: The method of any of aspects 19 through 26, further comprising: determining a resource type associated with the first subset of symbols of the set of symbols associated with the phase discontinuity, the resource type indicating a half-duplex type resource or a full-duplex type resource, wherein transmitting the wireless communication during the second subset of symbols of the set of symbols is based at least in part on determining the resource type.

Aspect 28: The method of any of aspects 19 through 27, further comprising: receiving capability information associated with the second device or a third device, wherein determining the phase discontinuity is based at least in part on receiving the capability information.

Aspect 29: An apparatus for wireless communication at a first device, comprising a processor; memory coupled with the processor; and instructions stored in the memory and executable by the processor to cause the apparatus to perform a method of any of aspects 1 through 18.

Aspect 30: An apparatus for wireless communication at a first device, comprising at least one means for performing a method of any of aspects 1 through 18.

Aspect 31: A non-transitory computer-readable medium storing code for wireless communication at a first device, the code comprising instructions executable by a processor to perform a method of any of aspects 1 through 18.

Aspect 32: An apparatus for wireless communication at a first device, comprising a processor; memory coupled with the processor; and instructions stored in the memory and executable by the processor to cause the apparatus to perform a method of any of aspects 19 through 28.

Aspect 33: An apparatus for wireless communication at a first device, comprising at least one means for performing a method of any of aspects 19 through 28.

Aspect 34: A non-transitory computer-readable medium storing code for wireless communication at a first device, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving a grant that schedules the wireless communication between the first device and a second device, the grant indicating a demodulation reference signal configuration indicating a set of symbols associated with the wireless communication;
   receiving control signaling comprising an indication of a first subset of symbols of the set of symbols associated with a phase discontinuity;
   receiving the wireless communication during a second subset of symbols of the set of symbols based at least in part on the demodulation reference signal configuration and the indication of the first subset of symbols of the set of symbols associated with the phase discontinuity; and
   estimating a channel based at least in part on receiving the wireless communication during the second subset of symbols.

2. The method of claim 1, wherein receiving the control signaling comprises:
receiving a semi-static control message comprising the indication of the first subset of symbols of the set of symbols associated with the phase discontinuity,
wherein the semi-static control message comprises a radio resource control configuration message.

3. The method of claim 1, wherein receiving the control signaling comprises:
receiving a dynamic control message comprising the indication of the first subset of symbols of the set of symbols associated with the phase discontinuity,
wherein the dynamic control message comprises a downlink control information or a medium access control-control element.

4. The method of claim 1, further comprising:
receiving the control signaling comprising the indication of the first subset of symbols of the set of symbols associated with the phase discontinuity based at least in part on a periodicity.

5. The method of claim 1, further comprising:
receiving the control signaling comprising the indication of the first subset of symbols of the set of symbols associated with the phase discontinuity based at least in part on a semi-persistent scheduling of the control signaling.

6. The method of claim 1, further comprising:
determining, based at least in part on the indication, one or more of a respective symbol location for each respective symbol of the first subset of symbols of the set of symbols associated with the phase discontinuity or a respective symbol duration for each respective symbol of the first subset of symbols of the set of symbols associated with the phase discontinuity,
wherein receiving the wireless communication during the second subset of symbols of the set of symbols is based at least in part on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

7. The method of claim 1, further comprising:
determining, based at least in part on the indication, one or more transmission time intervals associated with the first subset of symbols of the set of symbols associated with the phase discontinuity, the one or more transmission time intervals comprising one or more slots,
wherein receiving the wireless communication during the second subset of symbols of the set of symbols is based at least in part on determining the one or more transmission time intervals associated with the first subset of symbols of the set of symbols associated with the phase discontinuity.

8. The method of claim 1, further comprising:
determining, based at least in part on the indication, a communication direction associated with the wireless communication, the communication direction corresponding to an uplink direction or a downlink direction,
wherein receiving the wireless communication during the second subset of symbols of the set of symbols is based at least in part on determining the communication direction associated with the wireless communication.

9. The method of claim 1, further comprising:
determining, based at least in part on the indication, a resource type associated with the first subset of symbols of the set of symbols associated with the phase discontinuity, the resource type indicating a half-duplex type resource or a full-duplex type resource,
wherein receiving the wireless communication during the second subset of symbols of the set of symbols is based at least in part on determining the resource type.

10. The method of claim 1, further comprising:
determining, based at least in part on the indication, a beam direction associated with the first subset of symbols of the set of symbols associated with the phase discontinuity,
wherein receiving the wireless communication during the second subset of symbols of the set of symbols is based at least in part on determining the beam direction associated with the first subset of symbols of the set of symbols associated with the phase discontinuity.

11. The method of claim 1, further comprising:
determining, based at least in part on the indication, quasi-colocation information associated with the wireless communication,
wherein receiving the wireless communication during the second subset of symbols of the set of symbols is based at least in part on determining the quasi-colocation information associated with the wireless communication.

12. The method of claim 1, further comprising:
adjusting a parameter associated with a receiver of the UE based at least in part on the indication of the phase discontinuity,
wherein receiving the wireless communication during the second subset of symbols of the set of symbols is based at least in part on adjusting the parameter associated with the receiver of the UE.

13. The method of claim 12, wherein the parameter comprises a channel estimation algorithm or a frequency offset estimation algorithm.

14. The method of claim 1, further comprising:
receiving capability information associated with the second device or a third device, the capability information indicating the phase discontinuity.

15. The method of claim 1, further comprising:
receiving second control signaling indicating a measurement configuration, the measurement configuration indicating a threshold corresponding to phase continuity;
performing a set of phase continuity measurements based at least in part on the measurement configuration; and
transmitting a measurement report that indicates the set of phase continuity measurements, wherein receiving the control signaling is based at least in part on transmitting the measurement report.

16. The method of claim 1, further comprising:
determining the phase discontinuity associated with the wireless communication from the second device based at least in part on a phase difference associated with the wireless communication satisfying a threshold.

17. The method of claim 1, wherein the wireless communication corresponds to a density of demodulation reference signals satisfying a density threshold.

18. The method of claim 1, wherein one or more of the first device or the second device comprise a user equipment (UE), a repeater device, or a base station, or any combination thereof.

19. A method for wireless communication at a first device, comprising:
transmitting a grant that schedules the wireless communication between the first device and a second device, the grant indicating a demodulation reference signal configuration indicating a set of symbol durations associated with the wireless communication;

determining a phase discontinuity associated with a first subset of symbol durations of the set of symbol durations;

transmitting control signaling indicating the first subset of symbol durations of the set of symbol durations associated with the phase discontinuity; and transmitting the wireless communication during a second subset of symbol durations of the set of symbol durations based at least in part on the demodulation reference signal configuration and the phase discontinuity associated with the first subset of symbol durations.

20. The method of claim 19, wherein transmitting the control signaling comprises:

transmitting a semi-static control message comprising the indication of the first subset of symbols of the set of symbols associated with the phase discontinuity, wherein the semi-static control message comprises a radio resource control configuration message.

21. The method of claim 19, wherein transmitting the control signaling comprises:

transmitting a dynamic control message comprising the indication of the first subset of symbols of the set of symbols associated with the phase discontinuity, wherein the dynamic control message comprises a downlink control information or a medium access control-control element.

22. The method of claim 19, further comprising:

transmitting the control signaling comprising the indication of the first subset of symbols of the set of symbols associated with the phase discontinuity based at least in part on a periodicity.

23. The method of claim 19, further comprising:

transmitting the control signaling comprising the indication of the first subset of symbols of the set of symbols associated with the phase discontinuity based at least in part on a semi-persistent scheduling of the control signaling.

24. The method of claim 19, further comprising:

determining one or more of a respective symbol location for each respective symbol of the first subset of symbols of the set of symbols associated with the phase discontinuity or a respective symbol duration for each respective symbol of the first subset of symbols of the set of symbols associated with the phase discontinuity, wherein transmitting the wireless communication during the second subset of symbols of the set of symbols is based at least in part on determining one or more of the respective symbol location for each respective symbol of the first subset of symbols of the set of symbols associated with the phase discontinuity or the respective symbol duration for each respective symbol of the first subset of symbols of the set of symbols associated with the phase discontinuity.

25. The method of claim 19, further comprising:

determining one or more transmission time intervals associated with the first subset of symbols of the set of symbols associated with the phase discontinuity, the one or more transmission time intervals comprising one or more slots, wherein transmitting the wireless communication during the second subset of symbols of the set of symbols is based at least in part on determining the one or more transmission time intervals associated with the first subset of symbols of the set of symbols associated with the phase discontinuity.

26. The method of claim 19, further comprising:

determining a communication direction associated with the wireless communication, the communication direction corresponding to an uplink direction or a downlink direction, wherein transmitting the wireless communication during the second subset of symbols of the set of symbols is based at least in part on determining the communication direction associated with the wireless communication.

27. The method of claim 19, further comprising:

determining a resource type associated with the first subset of symbols of the set of symbols associated with the phase discontinuity, the resource type indicating a half-duplex type resource or a full-duplex type resource, wherein transmitting the wireless communication during the second subset of symbols of the set of symbols is based at least in part on determining the resource type.

28. The method of claim 19, further comprising:

receiving capability information associated with the second device or a third device, wherein determining the phase discontinuity is based at least in part on receiving the capability information.

29. An apparatus for wireless communication at a first device, comprising:

a processor;

memory coupled with the processor; and instructions stored in the memory and executable by the processor to cause the apparatus to:

receive a grant that schedules the wireless communication between the first device and a second device, the grant indicating a demodulation reference signal configuration indicating a set of symbols associated with the wireless communication;

receive control signaling comprising an indication of a first subset of symbols of the set of symbols associated with a phase discontinuity;

receive the wireless communication during a second subset of symbols of the set of symbols based at least in part on the demodulation reference signal configuration and the indication of the first subset of symbols of the set of symbols associated with the phase discontinuity; and estimate a channel based at least in part on receiving the wireless communication during the second subset of symbols.

30. An apparatus for wireless communication at a first device, comprising:

a processor;

memory coupled with the processor; and instructions stored in the memory and executable by the processor to cause the apparatus to:

transmit a grant that schedules the wireless communication between the first device and a second device, the grant indicating a demodulation reference signal configuration indicating a set of symbol durations associated with the wireless communication;

determine a phase discontinuity associated with a first subset of symbol durations of the set of symbol durations;

transmit control signaling indicating the first subset of symbol durations of the set of symbol durations associated with the phase discontinuity; and transmit the wireless communication during a second subset of symbol durations of the set of symbol durations based at least in part on the demodulation reference signal configuration and the phase discontinuity associated with the first subset of symbol durations.

* * * * *